United States Patent
Fuchigami et al.

(10) Patent No.: US 10,900,810 B2
(45) Date of Patent: Jan. 26, 2021

(54) ELECTRONIC EQUIPMENT THAT DETERMINES ROTATION DIRECTION AND ROTATING AMOUNT OF ROTATIONAL OPERATION MEMBER

(71) Applicant: CANON KABUSHIKI KAISHA, Tokyo (JP)

(72) Inventors: Taro Fuchigami, Yokohama (JP); Keita Hirayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 16/120,706

(22) Filed: Sep. 4, 2018

(65) Prior Publication Data
US 2019/0072412 A1  Mar. 7, 2019

(30) Foreign Application Priority Data

Sep. 6, 2017 (JP) .................................. 2017-171176

(51) Int. Cl.
  *G01D 5/14* (2006.01)
  *G01D 7/00* (2006.01)
  (Continued)

(52) U.S. Cl.
  CPC ............. *G01D 5/145* (2013.01); *G01D 7/007* (2013.01); *H01H 19/00* (2013.01); *H01H 19/11* (2013.01)

(58) Field of Classification Search
  CPC ... G01C 1/00; G01D 1/00; G01B 1/00; G01B 2210/00; G01R 1/00; G01P 1/00;
  (Continued)

(56) References Cited

U.S. PATENT DOCUMENTS 6,429,901 B1 * 8/2002 Kiyose .................. H03L 7/0895
                                                        348/500
8,378,858 B2   2/2013 Sadamori et al.
(Continued)

FOREIGN PATENT DOCUMENTS

CN   104583728 A   4/2015
CN   104769394 A   7/2015
(Continued)

OTHER PUBLICATIONS

Extended European Search Report issued in European Appln. No. 18192881.3 dated Feb. 25, 2019.
(Continued)

*Primary Examiner* — Jermele M Hollington
*Assistant Examiner* — Temilade S Rhodes-Vivour
(74) *Attorney, Agent, or Firm* — Rossi, Kimms & McDowell LLP

(57) ABSTRACT

An electronic equipment has a rotational operation member that can be downsized and has high detection reliability. The electronic equipment includes a rotational operation member, a click mechanism providing a click feeling at each predetermined rotation angle, and a magnetic field generating member. A first magnetic field detecting part detects variation of a first direction-related magnetic field generated by the magnetic field generating member, and a second magnetic field detecting part detects a variation of a second direction-related magnetic field generated by the magnetic field generating member. A rotation amount and a rotation direction of the rotational operation member are calculated based on the variations of the first direction-related magnetic field and the second direction-related magnetic field caused by a change in a positional relation of the first and second magnetic field detecting parts with the magnetic field gen-
(Continued)

erating member due to the rotation of the rotational operation member.

12 Claims, 15 Drawing Sheets

(51) Int. Cl.
 *H01H 19/00* (2006.01)
 *H01H 19/11* (2006.01)
(58) Field of Classification Search
 CPC ......... H02J 1/00; H02K 1/00; H02K 2201/00; H02P 1/00; H02P 2101/00; H02P 2201/00
 See application file for complete search history.

(56) References Cited

U.S. PATENT DOCUMENTS

| 8,698,447 | B2* | 4/2014 | Lumsden | H02P 23/24 |
| | | | | 318/812 |
| 2004/0207745 | A1* | 10/2004 | Tsuruta | H04N 5/2254 |
| | | | | 348/335 |
| 2005/0254145 | A1* | 11/2005 | Tsuzuki | G02B 7/102 |
| | | | | 359/701 |
| 2011/0134025 | A1* | 6/2011 | Yamamoto | G06F 3/0354 |
| | | | | 345/156 |
| 2015/0211890 | A1* | 7/2015 | Maiterth | G01R 33/075 |
| | | | | 324/207.2 |
| 2015/0221426 | A1* | 8/2015 | Furuki | G06F 3/0362 |
| | | | | 335/219 |
| 2016/0057321 | A1 | 2/2016 | Yamaura et al. | |
| 2016/0285403 | A1* | 9/2016 | Masuda | H02P 29/027 |
| 2018/0020163 | A1* | 1/2018 | Nishihara | H04N 5/23248 |

FOREIGN PATENT DOCUMENTS

| DE | 102016009006 A1 | 2/2017 |
| EP | 1394666 A1 | 3/2004 |
| JP | 2013073726 A | 4/2013 |
| JP | 2014229468 A | 12/2014 |
| WO | 2016196819 A3 | 1/2017 |

OTHER PUBLICATIONS

Office Action issued in Chinese Appln. No. 201811035679.2 dated Nov. 3, 2020. English translation provided.

Office Action issued in European Appln. No. 18192881.3 dated Nov. 10, 2020.

* cited by examiner

|  | STATE 1 | STATE 2 | STATE 3 | STATE 4 |
|---|---|---|---|---|
| LONGITUDINAL MAGNETIC FIELD SIGNAL | L | L | H | H |
| TRANSVERSE MAGNETIC FIELD SIGNAL | L | H | H | L |

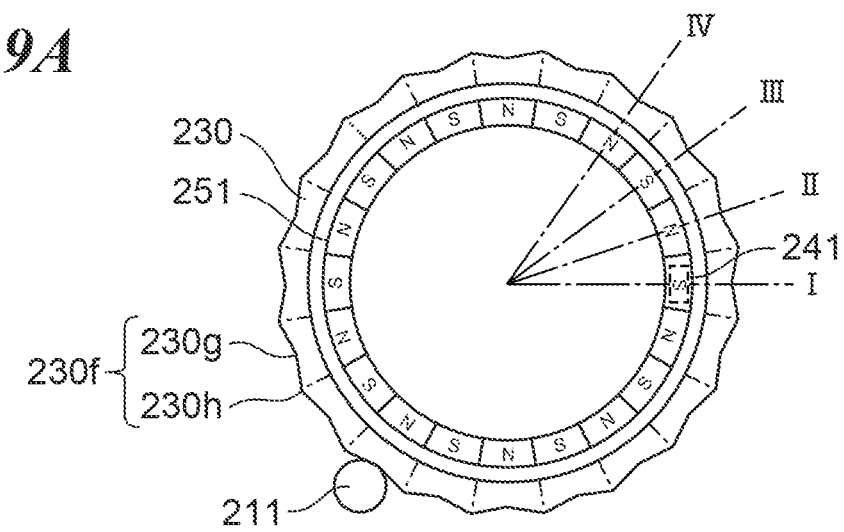
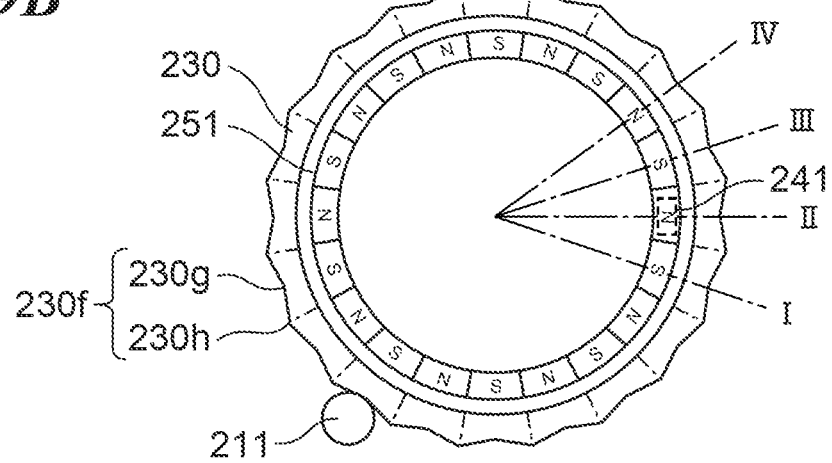
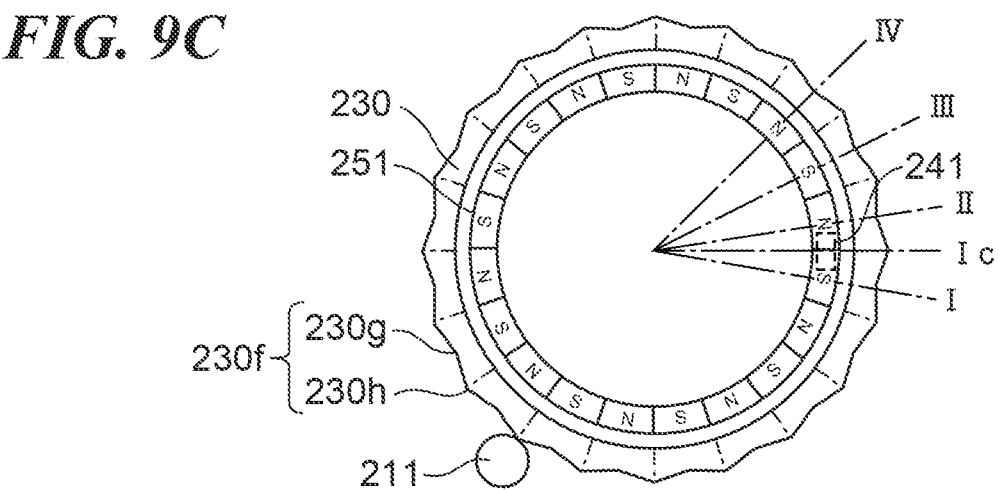

ELECTRONIC EQUIPMENT THAT DETERMINES ROTATION DIRECTION AND ROTATING AMOUNT OF ROTATIONAL OPERATION MEMBER

BACKGROUND OF THE INVENTION

Field of the Invention

The present invention relates to an electronic equipment including a rotational operation member.

The present invention relates more particularly to a structure of a rotational operation member (such as a rotary ring and a rotary dial) to be rotated by the user for operating an image pickup apparatus. The present invention can be applied to rotational operation members (such as rotary rings and rotary dials) of audio equipment, automobiles, aircraft, medical equipment, or the like, as well as rotational operation members of image pickup apparatuses.

Description of the Related Art

In some image pickup apparatuses such as digital cameras, the user can select settings for shooting and functions by rotating a rotational operation member such as a dial. To detect the rotation of such a rotational operation member, magnetic sensors have been used.

For example, Japanese Laid-Open Patent Publication (kokai) No. 2013-073726 discloses a structure including a rotational operation member, a ring-shaped rotating magnet having S poles and N poles arranged alternately along the circumference, and a giant magnetoresistance (GMR) sensor. The rotating magnet rotates together with the rotational operation member and the GMR sensor determines the rotation direction and rotation amount of the rotational operation member.

In the prior art disclosed in Japanese Laid-Open Patent Publication (kokai) No. 2013-073726, however, horizontal magnetic fields in different directions should be detected during one click in the rotation.

The magnetic pole pitch of the rotating magnet thus should be half the click pitch.

This means that the number of the magnetic poles of the rotating magnet should be double the total number of the total click during one rotation of the rotational operation member.

Since a larger number of the magnetic poles leads to a larger size of the magnet, the downsizing of the rotational operation member may be hindered in the above prior art.

If each magnetic pole is downsized, however, the generated magnetic flux density is lowered accordingly.

The structure having many magnetic poles cannot obtain sufficient magnetic flux density, which may deteriorate the reliability in detection of magnetic fields.

SUMMARY OF THE INVENTION

The present invention provides a rotational operation member that can be downsized and has high detection reliability.

Accordingly, the present invention provides an electronic equipment comprising: a rotational operation member rotatably held with respect to a rotation axis; a click mechanism configured to provide a click feeling at each predetermined rotation angle by rotation of the rotational operation member; a magnetic field generating member having magnetic poles with different magnetic properties arranged at regular intervals; a first magnetic field detecting part having a first detection axis and configured to detect a variation of a first direction-related magnetic field generated by the magnetic field generating member; a second magnetic field detecting part having a second detection axis and configured to detect a variation of a second direction-related magnetic field generated by the magnetic field generating member, the second direction being different from the first direction; and a calculating unit configured to calculate a rotation amount and a rotation direction of the rotational operation member based on the variation of the first direction-related magnetic field and the variation of the second direction-related magnetic field that are caused by a change in a positional relation of the first and second magnetic field detecting parts with the magnetic field generating member due to the rotation of the rotational operation member.

According to the present invention, a rotational operation member is provided that is compact and stably detects rotation without being affected by different assembly conditions, external forces, or the like.

Further features of the present invention will become apparent from the following description of exemplary embodiments with reference to the attached drawings.

BRIEF DESCRIPTION OF THE DRAWINGS

FIGS. 9A to 9C are views showing a positional relation between the magnet and a click member according to the present embodiment.

DESCRIPTION OF THE EMBODIMENTS

An electronic equipment of a first embodiment of the present invention will now be described with reference to FIGS. 1A, 1B, and 2. It should be noted that, in the present embodiment, the present invention is applied to an image pickup apparatus as an electronic equipment.

Figure 1A:
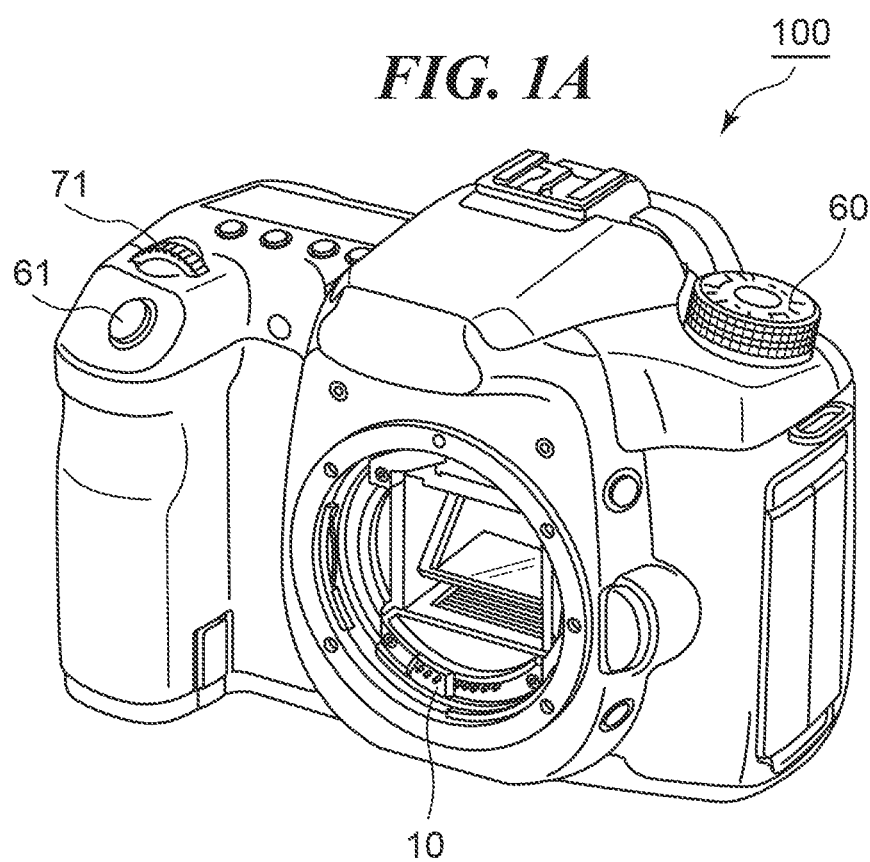
FIGS. 1A and 1B are external views of an electronic equipment according to a first embodiment of the present invention.
Figure 1B:
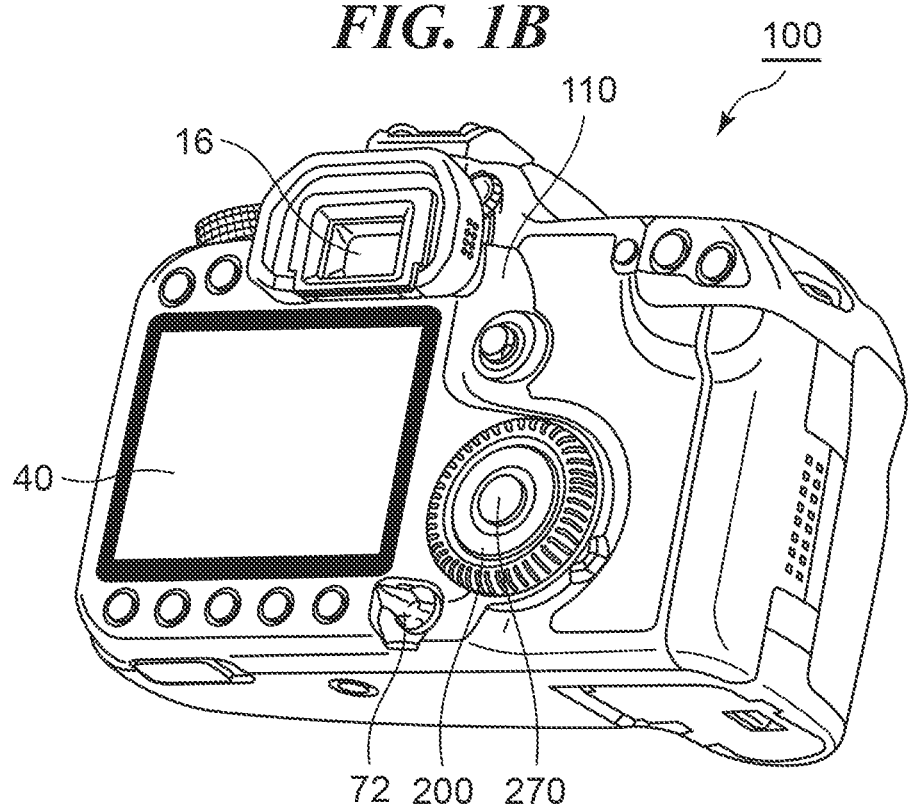

FIGS. 1A and 1B are external views showing an image pickup apparatus including a rotational operation member of the present invention.

FIG. 1A is a front perspective view of an image pickup apparatus 100, and FIG. 1B is a rear perspective view of the image pickup apparatus 100. A shutter button 61 is a part to be operated for providing instructions for shooting. A mode selection switch 60 is a part to be operated for switching various modes.

A dial 71 is a rotational operation member to be rotated for changing various setting values such as the shutter speed and the lens aperture.

A power switch 72 is a part to be operated for turning on and off the image pickup apparatus 100. A liquid crystal screen 40 is a display device employing a thin film transistor (TFT) and organic electroluminescence (OEL). The liquid crystal screen 40 shows various settings of the image pickup apparatus and images shot by the image pickup apparatus.

A rotational operation member 200 is a dial-shaped member that can be rotated both clockwise and counterclockwise without any limitation on the rotation amount. The rotational operation member 200 is used for performing various operations such as selecting shooting modes, selecting focus points, displaying and selecting images, and setting menus.

The rotational operation member 200 is also used for adjusting the position of a selection frame, displaying a series of images, and the like. A push button 270 is pushed for performing operations and mainly for selecting options.

A communication terminal 10 establishes communication between the image pickup apparatus 100 and a detachable taking lens (not shown).

A viewfinder 16 is an eye-level finder with a focusing screen (not shown) through which the user sees to check the focus of the optical image of a subject and the composition, which are visible through a lens unit (not shown).

Figure 2:
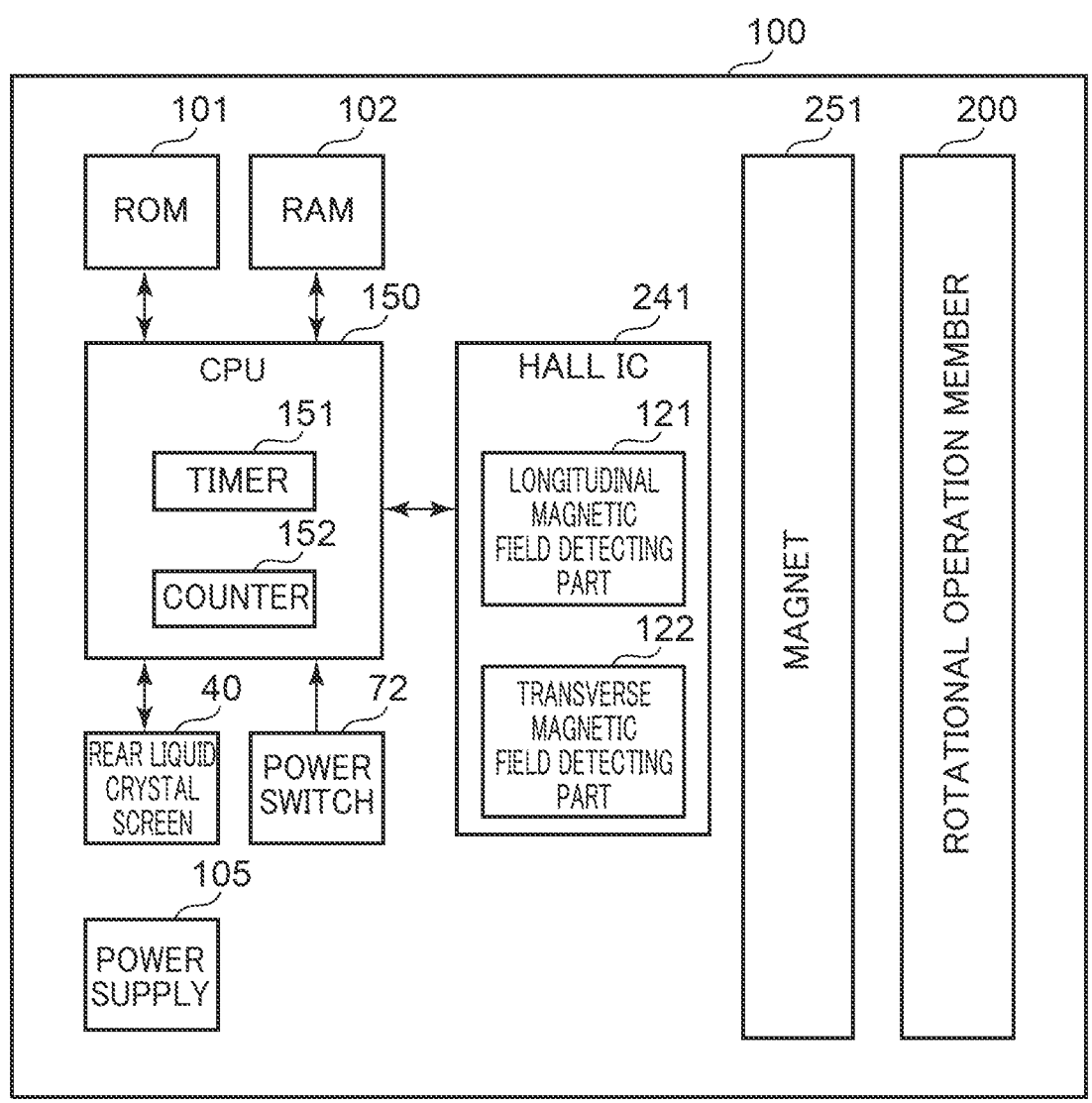
FIG. 2 is a system block diagram of the electronic equipment according to the present embodiment.

FIG. 2 is a system block diagram of the image pickup apparatus 100.

A nonvolatile memory 101 stores programs to be executed at the time of the operation of a CPU 150 described below. In the present embodiment, the nonvolatile memory 101 is a flash ROM, however, the nonvolatile memory 101 may be of other type of nonvolatile memories.

A RAM 102 temporarily stores image buffer shot by the image pickup apparatus 100 or processed image data. The RAM 102 is also used as a work memory at the time of the operation of the CPU 150 described below.

In the present embodiment, the RAM performs these functions, however, other type of memories with a sufficient access speed may perform these functions.

A power supply 105 is served for the image pickup apparatus 100. The power supply 105 includes a battery and an AC adapter, and supplies power to the individual blocks of the image pickup apparatus 100 directly or via a DC-DC converter (not shown), or the like.

The power switch 72 is served for the image pickup apparatus 100. In the present embodiment, as shown in FIG. 1B, the power switch 72 has mechanical ON and OFF positions.

The power switch 72 does not necessarily have such mechanical ON and OFF positions. The power switch 72 may be a push switch, an electric switch, or the like.

When the power supply 105 is inserted into the image pickup apparatus 100 but the power switch 72 is in the OFF state, the image pickup apparatus 100 cannot perform the image pickup function and stays in a low power consumption state.

When the power supply 105 is inserted into the image pickup apparatus 100 and the power switch 72 is in the ON state, the image pickup apparatus 100 can perform the image pickup function.

The CPU 150 controls all the parts of the image pickup apparatus 100. The CPU 150 achieves the image pickup function, that is, the basic function of the image pickup apparatus.

The CPU 150 also achieves other functions such as the function of switching the modes of the image pickup apparatus 100, the function of updating the display information of the liquid crystal screen 40, and the like in response to the detection results of the rotational operation member 200 in a Hall IC detection scheme described below.

A timer 151 has the function of measuring a predetermined time. The timer 151 is incorporated in the CPU 150 in FIG. 2, however, the timer 151 may be disposed outside the CPU 150.

The timer 151 has a function of starting and stopping the time measurement in response to instructions from the CPU 150.

The timer 151 also has a function of generating an interrupt event in the CPU 150 at regular time intervals while performing the time measurement all the time.

A counter 152 has a function of counting the number of operations of the rotational operation member 200 described below.

The counter 152 is built in the CPU 150 in FIG. 2, however, the counter 152 may be disposed outside the CPU 150.

The counter 152 counts the number of operations of the rotational operation member 200 in FIG. 2, however, the counter 152 may count the number of operations of any part to be operated by the user.

A Hall IC 241 is a magnetic sensor IC including a transverse magnetic field detecting part 122 configured to detect a magnetic field in a predetermined direction and a longitudinal magnetic field detecting part 121 configured to detect a magnetic field orthogonal to the magnetic field in the predetermined direction.

The Hall IC 241 is disposed outside the CPU 150 in FIG. 2, however, the Hall IC 241 may be built in the CPU 150.

The transverse magnetic field detecting part 122 of the Hall IC 241 has a predetermined upper threshold and a predetermined lower threshold, and outputs a predetermined signal when a detected magnetic flux density exceeds the upper threshold or falls below the lower threshold. The longitudinal magnetic field detecting part 121 of the Hall IC 241 also has a predetermined upper threshold and a predetermined lower threshold, and outputs a predetermined signal when a detected magnetic flux density exceeds the upper threshold or falls below the lower threshold.

The Hall IC 241 reads a magnetic flux density detected by the transverse magnetic field detecting part 122 or the longitudinal magnetic field detecting part 121 at predetermined timing in response to the instructions from the CPU 150.

The magnet 251 is a ring-shaped permanent magnet having S poles and N poles arranged alternately at regular pitches along the circumference.

The magnet 251 integrally rotates together with the rotational operation member 200. The Hall IC 241 detects a variation in a magnetic flux density, and the CPU 150 calculates a rotation direction and a rotation amount of the rotational operation member 200. It should be noted that details of the magnet 251 will be described below with reference to FIG. 3.

A structure of the rotational operation member 200 will now be described with reference to FIGS. 3, 4A, and 4B.

Figure 3:
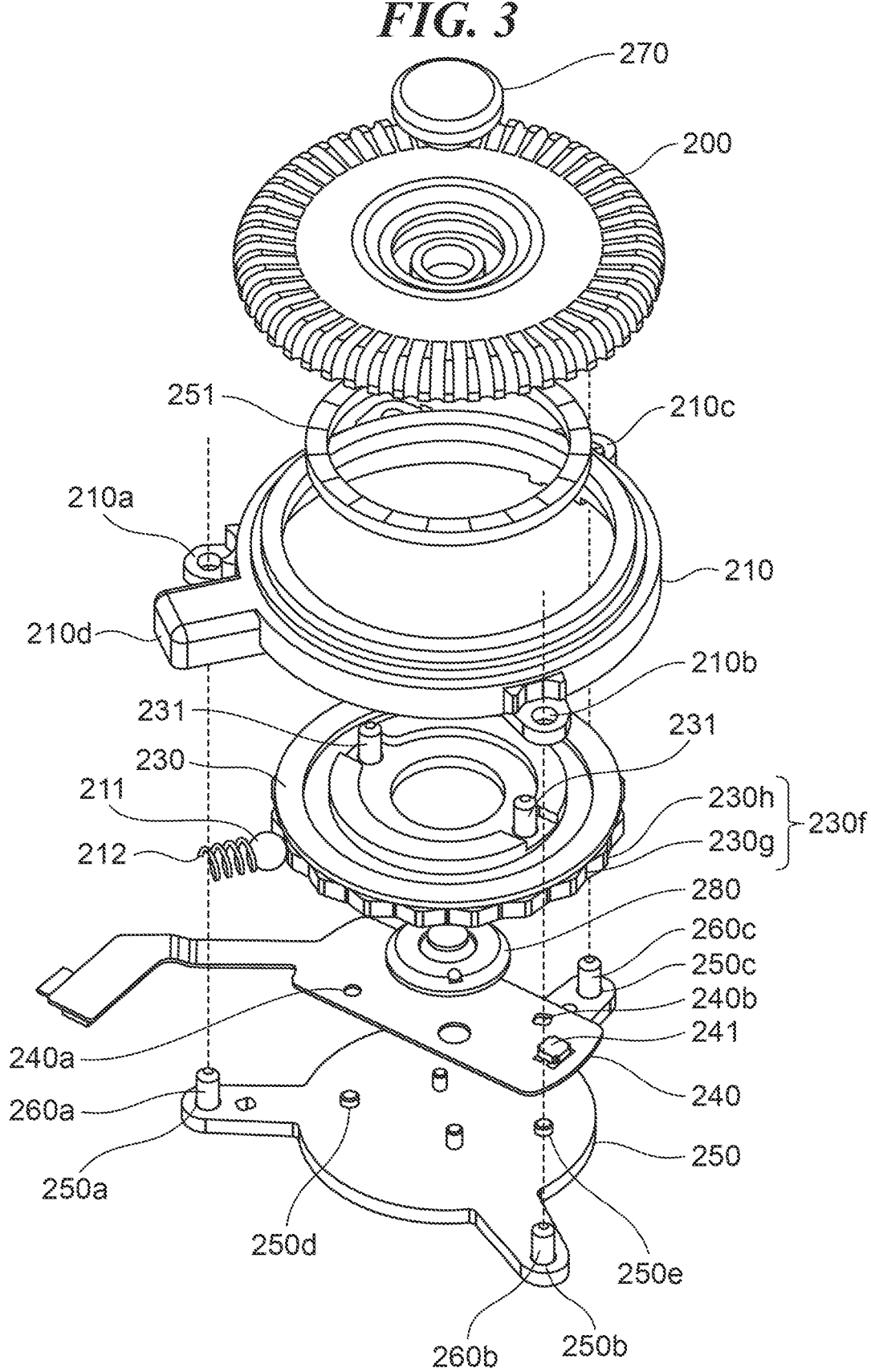
FIG. 3 is an exploded view of a structure of a rotational operation member in the electronic equipment shown in FIGS. 1A and 1B.

FIG. 3 is an exploded perspective view of an example of the structure of the rotational operation member 200.

Figure 4A:
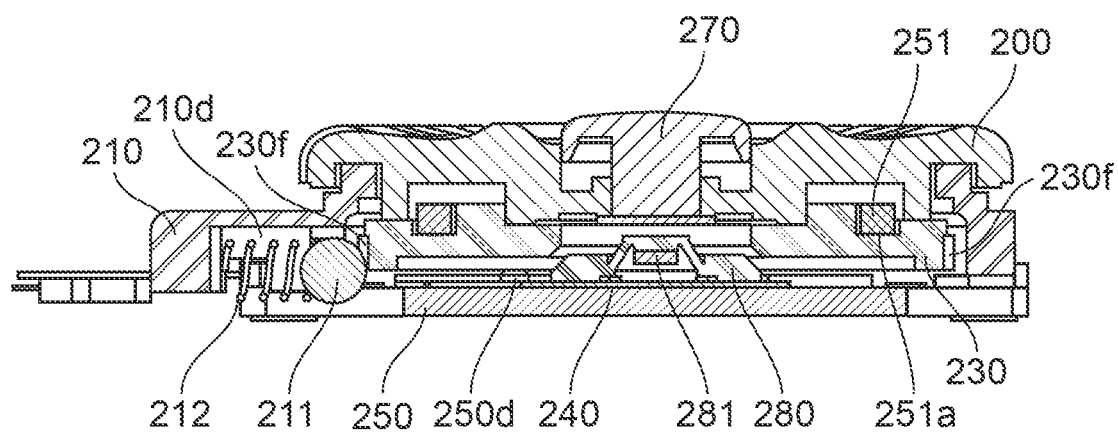
FIGS. 4A and 4B are cross-sectional views of the rotational operation member in the electronic equipment shown in FIGS. 1A and 1B.
Figure 4B:
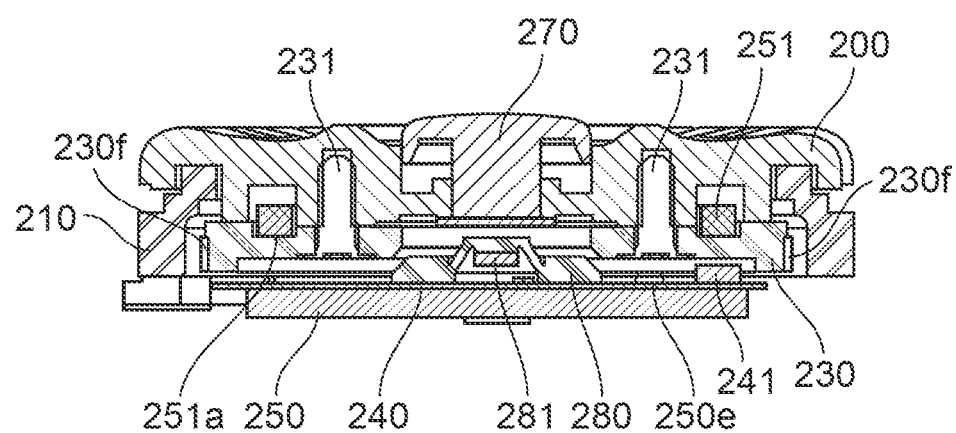

FIG. 4A is a cross-sectional view of the rotational operation member 200 taken along the line passing through the center of a ball member 211 described below, and FIG. 4B is a cross-sectional view of the rotational operation member 200 taken along the line passing through the center of the Hall IC 241.

The rotational operation member 200 is a member to be rotated both clockwise and counterclockwise by the user. A base member 210 rotatably holds the rotational operation member 200.

The base member 210 is fixed at three fixing parts 210a, 210b, and 210c on a rear cover 110 (not shown in FIGS. 3, 4A, and 4B) of the image pickup apparatus 100.

An annular magnet holding member 230 is fixed on the inner side of the rotational operation member 200 by a screw 231.

The magnet 251 has an annular shape and an alternate arrangement of N poles and S poles at regular pitches.

The magnet 251 as a magnetic field generating member has a polarized surface 251a of each of the N poles and S poles, and generates a magnetic field orthogonal to each of the polarized surfaces 251a.

The magnet 251 functions as a magnetic field generating member having opposite magnetic poles arranged alternately at regular pitches.

The magnetic field generating member, which is the magnet 251, generates a magnetic field in a plane orthogonal to the rotation axis of the rotational operation member 200 and between the magnetic field generating member and the rotation axis.

The magnet 251 as the magnetic field generating member is fixed at a predetermined angle to the rotational operation member 200. The magnet 251 and the magnet holding member 230 rotate integrally together following the rotation of the rotational operation member 200.

The ball member 211 is held in a ball holding part 210d of the base member 210 such that the ball member 211 can move back and forth in the direction orthogonal to the rotation axis of the rotational operation member 200.

A spring member 212 urges the ball member 211 in the direction toward a jagged edge 230f of the magnet holding member 230.

The jagged edge 230f has depressions 230g and projections 230h formed alternately at regular pitches along the outer circumference of the magnet holding member 230.

When the user rotates the rotational operation member 200, the ball member 211 moves back and forth in the ball holding part 210d along the jagged edge 230f, which provides the user with a click feeling.

The ball member 211 and the jagged edge 230f constitute a click mechanism that provides the rotational operation member 200 with the click feeling at each predetermined rotation angle.

The Hall IC 241 determines the strengths of magnetic fields in two directions (a longitudinal magnetic field and a transverse magnetic field described below).

The Hall IC 241 is mounted on a base plate 240. The base plate 240 has base plate positioning holes 240a and 240b. The Hall IC 241 is positioned by fitting bosses 250d and 250e of a base plate fixing plate 250 into the base plate positioning holes 240a and 240b so that the Hall IC 241 faces the polarized surfaces 251a of the magnet 251.

This structure enables the Hall IC 241 to detect the magnetic fields generated from the polarized surfaces 251a of the magnet 251. Details of the detection method will be described below.

The base plate fixing plate 250 has three mounting parts 250a, 250b, and 250c. The base plate fixing plate 250 and the base member 210 are coupled to and fixed on the rear cover 110 (not shown in FIGS. 3, 4A, and 4B) at the mounting parts 250a, 250b, and 250c, and the fixing parts 210a, 210b, and 210c by screws 260a, 260b, and 260c.

When the rotational operation member 200 is rotated under these circumstances, the magnet 251 rotates integrally together with the rotational operation member 200, which provides a variation in a magnetic field around the Hall IC 241.

The rotation of the rotational operation member 200 can thus be detected by detecting the variation in the magnetic field with the Hall IC 241.

The push button 270 is used when the rotational operation member 200 is operated. The user can select an option in an operation menu with the rotational operation member 200 and enter the option with the push button 270.

The push button 270 is held so that the push button 270 can slide in a rotation axis direction of the rotational operation member 200.

When the push button 270 is pushed, a rubber switch 280 is moved by the push button 270 and a conductive part 281 of the rubber switch 280 comes into contact with an electrode pad on the base plate. The operation of the push button switch is detected in this way.

The magnetic fields generated by the magnet 251 and the detection of the magnetic fields by the Hall IC 241 will now be described with reference to FIGS. 5A to 5F.

Figure 5A:
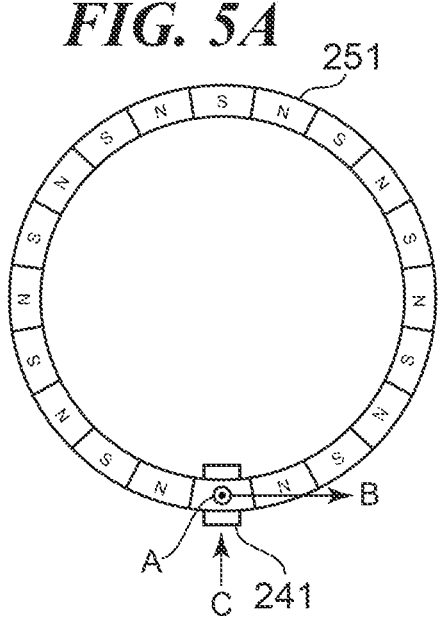
FIGS. 5A to 5F are views showing an arrangement of a magnet and a Hall IC according to the present embodiment.
Figure 5B:
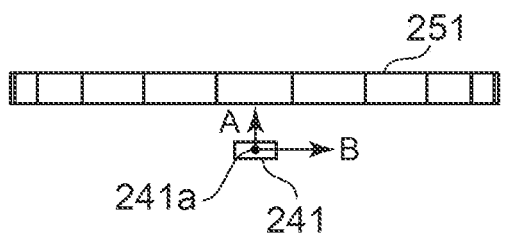

FIG. 5A shows the magnet 251 and the Hall IC 241 viewed from a rotation axis direction of the dial, and FIG. 5B shows the magnet 251 and the Hall IC 241 viewed from a direction orthogonal to the rotation axis (the direction of the arrow C shown).

The magnet 251 has twenty magnetic poles consisting of ten N poles and ten S poles arranged alternately at regular pitches.

The magnet 251 is a magnetic field generating member made of an annular magnet having N poles and S poles arranged alternately at regular pitches.

The magnet 251 may be a magnetic field generating member made of 20 magnets arranged in circle at regular pitches.

The Hall IC 241 is disposed to face the polarized surfaces 251a of the magnet 251, and a detecting part 241a of the Hall IC 241 is aligned with the width-direction center of the magnet 251.

The Hall IC 241 determines the magnetic flux density of a magnetic field in the central axis direction of the magnet 251 (the rotation axis direction of the dial (the direction of the arrow A)) and the magnetic flux density of a magnetic field in a tangent direction to the circumference of the magnet 251 (the direction of the arrow B), and outputs predetermined signals indicating the conditions of the respective magnetic fields.

Details of the signals output from the Hall IC 241 will be described below.

Figure 5C:
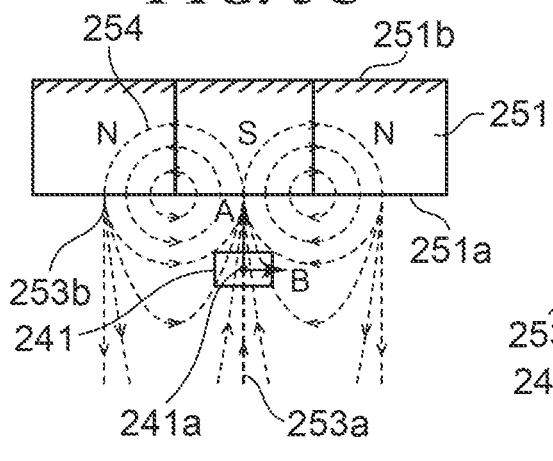
Figure 5D:
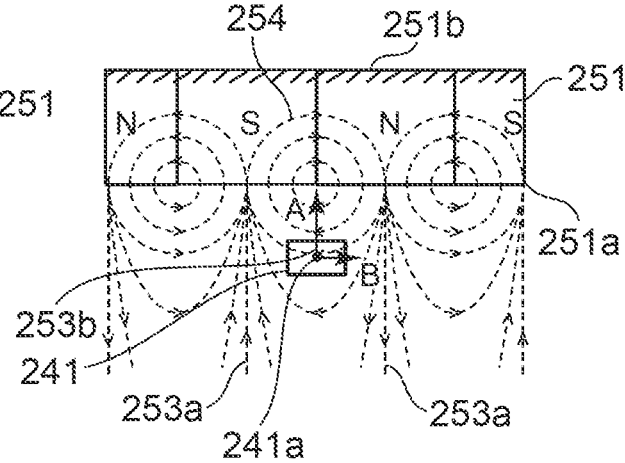

FIGS. 5C and 5D are enlarged views of an area around the Hall IC 241 with the magnet 251 viewed from the direction orthogonal to the rotation axis of the dial (the direction of the arrow C).

FIG. 5C shows a state in which the detecting part 241a of the Hall IC 241 is aligned with the center of an S pole in the lateral direction of the drawing.

FIG. 5D shows a state in which the detecting part 241a of the Hall IC 241 is aligned with the border between an S pole and an N pole after the rotation of the magnet 251 around the rotation axis of the dial from the state shown in FIG. 5C.

The magnet 251 has a polar anisotropy orientation.

This means that a magnetic field inside the magnet 251 is not in straight lines orthogonal to the polarized surfaces 251a.

Specifically, as shown in an intra-magnet magnetic field 254, a magnetic field inside the magnet 251 goes up orthogonally from the polarized surface 251a of an S pole, curves toward an N pole, and goes down orthogonally to the polarized surface 251a of the N pole.

Outside the magnet 251, as shown in magnetic field 253a and magnetic field 253b, magnetic flux goes up orthogonally from an N pole and then curves toward an S pole.

Figure 5E:
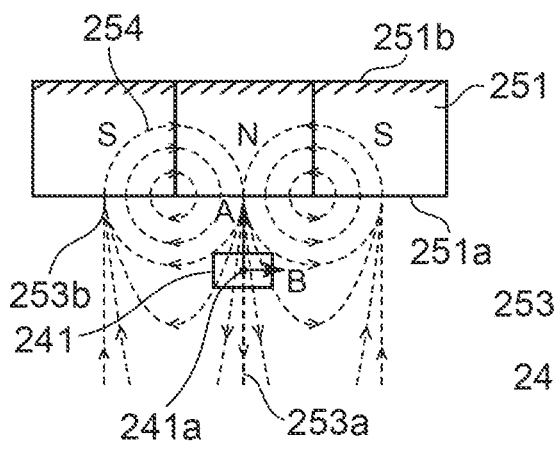
Figure 5F:
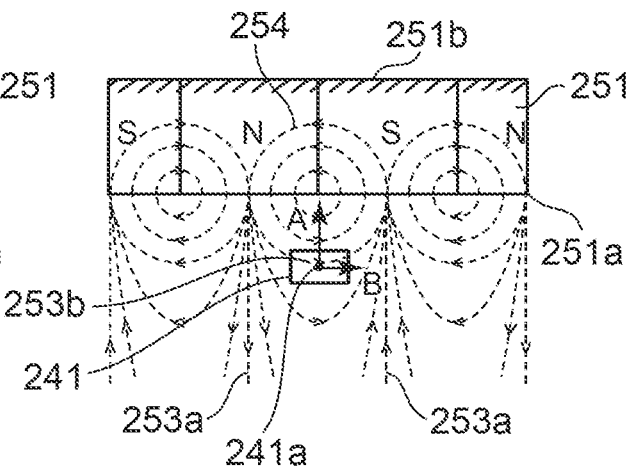

Likewise, FIG. 5E shows a state in which the detecting part 241a of the Hall IC 241 is aligned with the center of an N pole in the lateral direction of the drawing. FIG. 5F shows a state in which the detecting part 241a of the Hall IC 241 is aligned with the border between an S pole and an N pole after a relative movement of the detecting part 241a by one magnetic pole from the state shown in FIG. 5D.

Here, the magnetic field in the direction of the arrow A in FIG. 5A is defined as a longitudinal magnetic field 253a, and the magnetic field in the direction of the arrow B in FIG. 5A is defined as a transverse magnetic field 253b.

In the state shown in FIG. 5C, the detecting part 241a of the Hall IC 241 detects the longitudinal magnetic field 253a but does not detect the transverse magnetic field 253b.

To the contrary, in the state shown in FIG. 5D, the detecting part 241a detects the transverse magnetic field 253b but does not detect the longitudinal magnetic field 253a.

In the state between FIG. 5C and FIG. 5D, the detecting part 241a detects both the longitudinal magnetic field 253a and the transverse magnetic field 253b with the strengths of which depend on the rotational position.

This means that FIG. 5C shows a state in which the longitudinal magnetic field 253a is at the maximum and the transverse magnetic field 253b is zero, and FIG. 5D shows a state in which the longitudinal magnetic field 253a is zero and the transverse magnetic field 253b is at the maximum.

While the magnet 251 is being rotated around the rotation axis of the dial, the longitudinal magnetic field 253a and the transverse magnetic field 253b detected by the detecting part 241a of the Hall IC 241 vary their values between zero and the respective maximum values depending on the rotational position.

Details of the relation between variations in the magnetic fields and the signals output from the Hall IC 241 during the rotation of the dial will now be described with reference to FIGS. 6A and 6B.

Figures 6A, 6B:
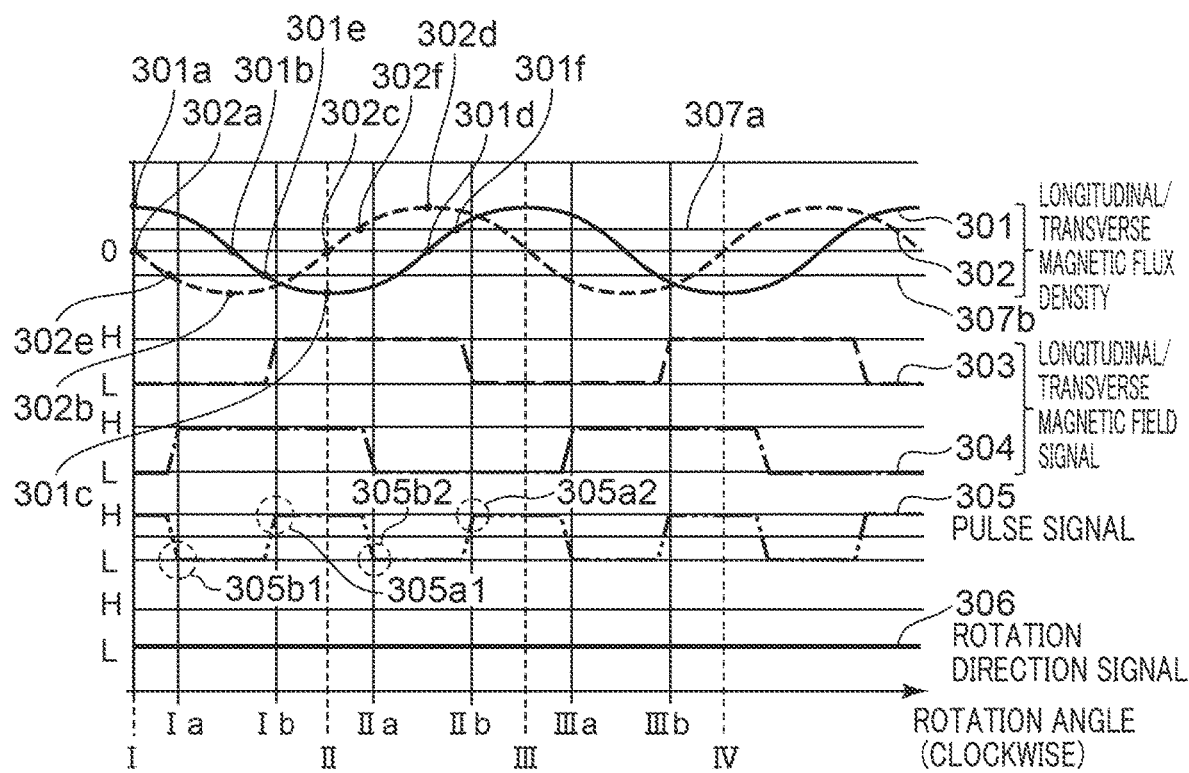
FIGS. 6A and 6B are a graph and a table showing a relation between magnetic fields and signals generated by the Hall IC according to the present embodiment.

FIG. 6A is a graph showing a relation between the strengths of a longitudinal magnetic field and a transverse magnetic field, and an output of the Hall IC 241, which has determined the strengths of these magnetic fields. The horizontal axis shows the rotation angles of the rotational operation member 200, and the vertical axis shows the magnetic field strengths and the signal output values.

As described above, the rotational operation member 200 of the present embodiment includes the click mechanism consisting of the jagged edge 230f and the ball member 211 with the spring member 212, and the rotational operation member 200 is rotated click by click.

In FIG. 6A, the horizontal axis shows click positions I to IV, and a distance between adjacent click positions corresponds to an angle for one click. The ball member 211 is in contact with the depressions 230g at the click positions I to IV.

In FIG. 6A, a longitudinal magnetic flux density 301 and a transverse magnetic flux density 302 are shown in the uppermost area. The longitudinal magnetic flux density 301 is the magnetic flux density of the longitudinal magnetic field 253a detected by the Hall IC 241 (see FIG. 5C).

The transverse magnetic flux density 302 is the magnetic flux density of the transverse magnetic field 253b detected by the Hall IC 241 (see FIG. 5D).

It is presumed here that the rotational operation member 200 is rotated clockwise at a constant speed. As clearly shown in FIG. 6A, each magnetic flux density periodically varies between the maximum value and the minimum value with respect to zero.

At the rotation angle I, the longitudinal magnetic flux density 301 is at the maximum as indicated by the point 301a. In the same state, the transverse magnetic flux density 302 is zero as indicated by the point 302a.

This means that the magnetic fields detected by the Hall IC 241 contain only the elements in the direction of the arrow A and no elements in the direction of the arrow B as shown in FIG. 5C.

The rotational operation member 200 continues to be rotated from this state, and the longitudinal magnetic flux density 301 becomes zero in the state indicated by the point 301b. In the same state, the transverse magnetic flux density 302 reaches the minimum value as indicated by the point 302b.

This means that the magnetic fields detected by the Hall IC 241 contain only the elements in the direction of the arrow B and no elements in the direction of the arrow A as shown in FIG. 5D, and the direction of the magnetic fields is opposite to the direction of the arrow B.

When the state progresses to the state indicated by the points 301c and 302c due to the continuous rotation of the rotational operation member 200, the magnetic fields detected by the Hall IC 241 contain only the elements in the direction opposite to the direction of the arrow A and no elements in the direction of the arrow B as shown in FIG. 5E.

By this time, the rotational operation member 200 has been rotated by substantially one click from the rotation angle I to the rotation angle II. When the state progresses to the state indicated by the points 301d and 302d, the magnetic fields contain only the elements in the direction of the arrow B and no elements in the direction of the arrow A as shown in FIG. 5F.

During the time between FIG. 5C and FIG. 5D, the time between FIG. 5D and FIG. 5E, and the time between FIG. 5E and FIG. 5F; the longitudinal magnetic flux density 301 and the transverse magnetic flux density 302 vary their values depending on the rotation angle of the rotational operation member 200.

As described above, when the rotational operation member 200 is rotated by substantially one click, the magnet 251 rotates by one magnetic pole and the longitudinal magnetic flux density 301 and the transverse magnetic flux density 302 each progress by substantially a half period.

This means that a periodic signal having a period corresponding to one magnetic pole pitch is generated although the longitudinal magnetic flux density 301 and the transverse magnetic flux density 302 each progress by only a half period.

The CPU 150 functions as a signal generating unit configured to generate a first signal and a second signal each having a period corresponding to the double of a predetermined rotation angle with a predetermined shift corresponding to the predetermined rotation angle or less.

The rotation amount and the rotation direction of the rotational operation member 200 are calculated by determining the order and the number of the maximum values of the two signals.

The CPU 150 functions as a calculating unit configured to calculate the rotation amount and the rotation direction of the rotational operation member 200 depending on a variation in a first direction-related magnetic field and a variation in a second direction-related magnetic field.

The signals output by the Hall IC 241 will now be described. FIG. 6A shows an upper threshold 307a and a lower threshold 307b of the Hall IC 241 overlapping the longitudinal magnetic flux density 301 and the transverse magnetic flux density 302.

The Hall IC 241 periodically samples magnetic flux passing through the detecting part 241a.

When a longitudinal magnetic flux density or a transverse magnetic flux density determined by the Hall IC 241 exceeds the upper threshold 307a or falls below the lower threshold 307b, the Hall IC 241 changes the state of a longitudinal magnetic field signal 303 or a transverse magnetic field signal 304 inside itself.

The way of changing the states of the signals will now be described in detail. The longitudinal magnetic field signal 303 is generated based on the longitudinal magnetic flux density 301, and the transverse magnetic field signal 304 is generated based on the transverse magnetic flux density 302.

When each magnetic flux density exceeds the upper threshold 307a, the state of the corresponding signal is changed from H(Hi) to L(Lo). When each magnetic flux density falls below the lower threshold 307b, the state of the corresponding signal is changed from L(Lo) to H(Hi).

Otherwise, the current values of the signals are kept.

For example, at the rotation angle I in FIG. 6A, the longitudinal magnetic flux density 301 is above the upper threshold 307a.

Therefore, the longitudinal magnetic field signal 303 is in the L state. On the other hand, the transverse magnetic flux density 302 has not fallen below the lower threshold 307b yet since exceeding the upper threshold 307a.

Therefore, the transverse magnetic flux density 302 is also in the L state (the state 1 in FIG. 6B).

While the rotational operation member 200 is being rotated after this state, the Hall IC 241 periodically samples magnetic flux densities and updates the longitudinal magnetic field signal 303 and the transverse magnetic field signal 304. After that, the state progresses to the point 302e.

In this state, the transverse magnetic flux density 302 is below the lower threshold 307b. Immediately after that, the Hall IC 241 determines the magnetic flux density at the time of the sampling at the rotation angle Ia.

The Hall IC 241 finds by the determination that the transverse magnetic flux density 302 has fallen below the lower threshold 307b, and changes the state of the transverse magnetic field signal 304 from L to H.

At this point of time, the longitudinal magnetic flux density 301 is not below the lower threshold 307b, and the longitudinal magnetic field signal 303 stays in the L state (the state 2 in FIG. 6B).

When the state goes beyond the point 301e due to the continuous rotation of the rotational operation member 200, the longitudinal magnetic flux density 301 falls below the lower threshold 307b.

Immediately after this, the Hall IC 241 determines the magnetic flux density at the rotation angle Ib. The Hall IC 241 finds by the determination that the longitudinal magnetic flux density 301 has fallen below the lower threshold 307b, and changes the state of the longitudinal magnetic field signal 303 from L to H.

At this point of time, the transverse magnetic flux density 302 is not above the upper threshold 307a, and the transverse magnetic field signal 304 stays in the H state (the state 3 in FIG. 6B).

When the state progresses to the point 302f due to the continuous rotation of the rotational operation member 200, the transverse magnetic flux density 302 exceeds the upper threshold 307a.

At the time of the sampling at the rotation angle IIa immediately after this, the state of the transverse magnetic field signal 304 is changed from H to L but the longitudinal magnetic field signal 303 stays in the H state (the state 4 in FIG. 6B).

When the state progresses to the point 301f, the longitudinal magnetic flux density 301 exceeds the upper threshold 307a. At the time of the sampling at the rotation angle IIb immediately after this, the longitudinal magnetic field signal 303 changes the state from H to L. The transverse magnetic field signal 304, however, stays in the L state (the state 1 in FIG. 6B).

In this way, while the magnet 251 is rotating at a constant speed integrally together with the rotational operation member 200, the Hall IC 241 outputs the longitudinal magnetic field signal 303 having a rectangular waveform and the same period as the period of the longitudinal magnetic flux density 301 and the transverse magnetic field signal 304 having a rectangular waveform and the same period as the period of the transverse magnetic flux density 302.

In this structure, the longitudinal magnetic flux density 301 and the transverse magnetic flux density 302 having analog waveforms are converted into the signals having the rectangular waveforms, which enables the CPU 150 to easily perform processing based on the longitudinal magnetic flux density 301 and the transverse magnetic flux density 302.

Here, the exclusive OR (XOR) of the longitudinal magnetic field signal 303 and the transverse magnetic field signal 304 is used. The resulting signal based on the logical sum of these signals becomes a pulse signal 305 as shown.

As clearly shown in FIG. 6A, the pulse signal 305 has a rectangular waveform and a period half the period of the longitudinal magnetic field signal 303 and the transverse magnetic field signal 304. The period of the pulse signal 305 corresponds to one click of the rotational operation member 200.

This means that the rotation of the rotational operation member 200 during one click can be detected by monitoring the pulse signal 305.

As described above, in the rotational operation member of the present embodiment, the pitch of the jagged edge 230*f*, which provides the rotational operation member 200 with the click feeling, is equal to the magnetic pole pitch of the magnet 251.

The rotation of the rotational operation member 200 during one click causes the longitudinal magnetic field signal 303 and the transverse magnetic field signal 304 to progress by only a half period, which disables the rotation during one click to be detected by using only one of the signals.

To solve this problem, if the magnetic pole pitch of the magnet 251 is designed to be half the pitch of the jagged edge 230*f*, one click causes the longitudinal magnetic field signal 303 and the transverse magnetic field signal 304 to progress by one period.

However, the distance between the magnetic poles has the lower limit due to the limits related to the polarization process; accordingly, thus increase in the number of the magnetic poles may increase the size of the magnet.

In the present embodiment, the exclusive OR of the longitudinal magnetic field signal 303 and the transverse magnetic field signal 304 is used to generate the signal that progresses by one period without changing the magnetic pole pitch corresponding to one click. This prevents the increase in the size of the magnet.

In addition, the single Hall IC 241 of the present embodiment detects both a longitudinal magnetic field and a transverse magnetic field, which prevents the longitudinal magnetic field signal and the transverse magnetic field signal from being shifted from each other in an undesirable manner.

Alternatively, two Hall ICs may be used so that one of the Hall ICs detects a longitudinal magnetic field of the magnet 251 and the other detects a transverse magnetic field of the magnet 251. Details of the mechanism will be described below in the description of a third embodiment.

It should be noted that a displacement in the positional relation between the Hall ICs affects the detection performance in this case, which makes it necessary to precisely dispose the two Hall ICs.

In the present embodiment, since the single Hall IC detects magnetic fields in two directions, the positional relation between the magnet and the Hall IC has little effect on the detection performance.

Therefore, the present embodiment provides the rotational operation member that is affected little by a displacement between the components due to a misalignment during the assembly process, an external force, a change in environment, or the like.

FIG. 6A shows a rotation direction signal 306 at the bottom. The rotation direction signal 306 indicates the rotation direction of the rotational operation member 200. The L state indicates a state in which the rotational operation member 200 is being rotated clockwise, and the H state indicates a state in which the rotational operation member 200 is being rotated counterclockwise.

Details of the generation of the rotation direction signal 306 will now be described.

FIG. 6B shows a table containing possible combinations of the states of the longitudinal magnetic field signal 303 and the transverse magnetic field signal 304. There are four states 1 to 4 based on the combinations of the states (H and L) of the signals.

For example, the state 1 corresponds to the combination of the states of the signals between the rotation angle I and the rotation angle Ia.

Since the state of the transverse magnetic field signal 304 is changed at the rotation angle Ia, the combination of the states of the signals is in the state 2 between the rotation angle Ia and the rotation angle Ib.

Likewise, the combination of the states of the signals is in the state 3 between the rotation angle Ib and the rotation angle IIa, the combination of the states of the signals is in the state 4 between the rotation angle IIa and the rotation angle IIb, and the combination of the states of the signals is in the state 1 again between the rotation angle IIb and the rotation angle IIIa.

While the rotational operation member 200 is being rotated clockwise, the combination of the states of the longitudinal magnetic field signal 303 and the transverse magnetic field signal 304 changes in the order of the state 1, the state 2, the state 3, the state 4, and the state 1.

While the rotational operation member 200 is being rotated counterclockwise, the combination of the states of the signals changes in the order of the state 1, the state 4, the state 3, the state 2, and the state 1, the details of which will be described below.

The rotation direction of the rotational operation member 200 can thus be determined by monitoring changes in the states of the longitudinal magnetic field signal 303 and the transverse magnetic field signal 304.

The Hall IC 241 performs this processing inside itself, and outputs the determined rotation direction as H (in the case of the counterclockwise rotation) or L (in the case of the clockwise rotation).

The signal processing in the case of the counterclockwise rotation of the rotational operation member 200 will now be described with reference to FIG. 7.

Figure 7:
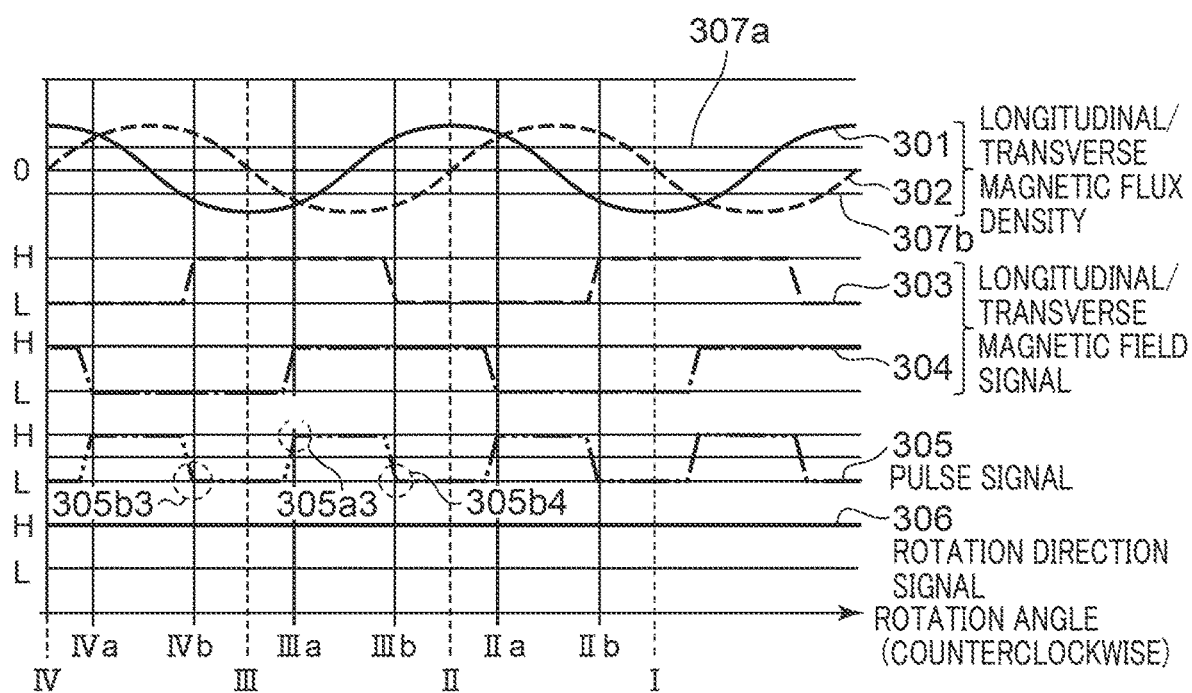
FIG. 7 is a graph showing a relation between magnetic fields and signals generated by the Hall IC according to the present invention.

In FIG. 7, the same signals as those in FIG. 6A are provided with the same reference signs, and only the difference from FIG. 6A will be described below.

FIG. 7 shows a state in which the rotational operation member 200 is rotated counterclockwise from a given click position IV to the click position I.

The longitudinal magnetic field signal 303 and the transverse magnetic field signal 304 are generated based on the longitudinal magnetic flux density 301 and the transverse magnetic flux density 302, respectively, and the pulse signal 305 is generated based on the longitudinal magnetic field signal 303 and the transverse magnetic field signal 304 as in the case of the clockwise rotation.

The combinations of the states of the longitudinal magnetic field signal 303 and the transverse magnetic field signal 304 will now be described as in FIG. 6B. Since the longitudinal magnetic field signal 303 is in the L state and the transverse magnetic field signal 304 is in the H state between the angle IV and the angle IVa, the combination of the states of the signals is in the state 2.

Since the longitudinal magnetic field signal 303 is in the L state and the transverse magnetic field signal 304 is in the L state between the angle IVa and the angle IVb, the combination of the states of the signals is in the state 1.

Likewise, the combination of the states of the signals is in the state 4 between the angle IVb and the angle IIIa, in the state 3 between the angle IIIa and the angle IIIb, and in the state 2 between the angle IIIb and the angle IIa. The combination of the states of the signals changes in the order of the state 2, the state 1, the state 4, the state 3, and the state 2 while the rotational operation member 200 is being rotated.

As described above, this order indicates the counterclockwise rotation of the rotational operation member 200, so that the Hall IC 241 outputs the rotation direction signal 306 in the H (counterclockwise rotation) state.

The signal processing for detecting the rotation of the rotational operation member 200 based on the pulse signal 305 and the rotation direction signal 306 will now be described with reference to FIGS. 8A and 8B.

Figure 8A:
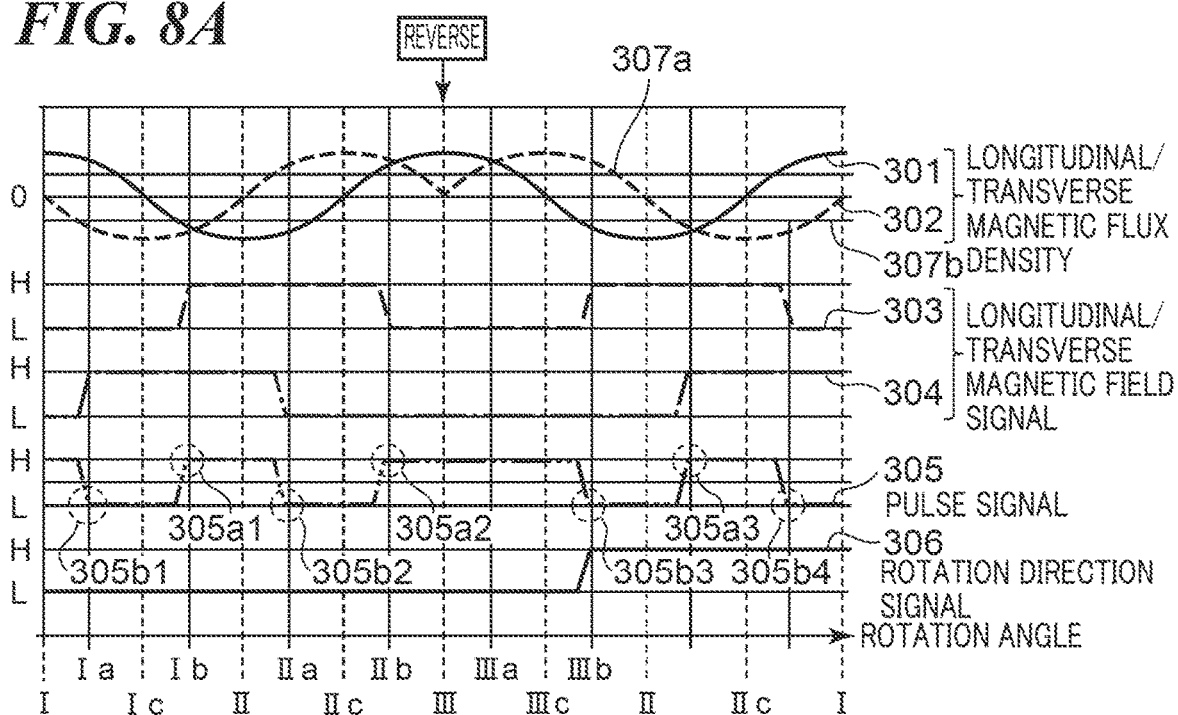
FIG. 8A is a graph showing a relation between magnetic fields and signals generated by the Hall IC according to the present embodiment.

FIG. 8A shows the longitudinal magnetic flux density, the transverse magnetic flux density, and the other signals during the time in which the rotational operation member 200 is rotated clockwise by two clicks from the rotation angle I to the rotation angle III and then is rotated counterclockwise by two clicks back to the angle I.

Figure 8B:
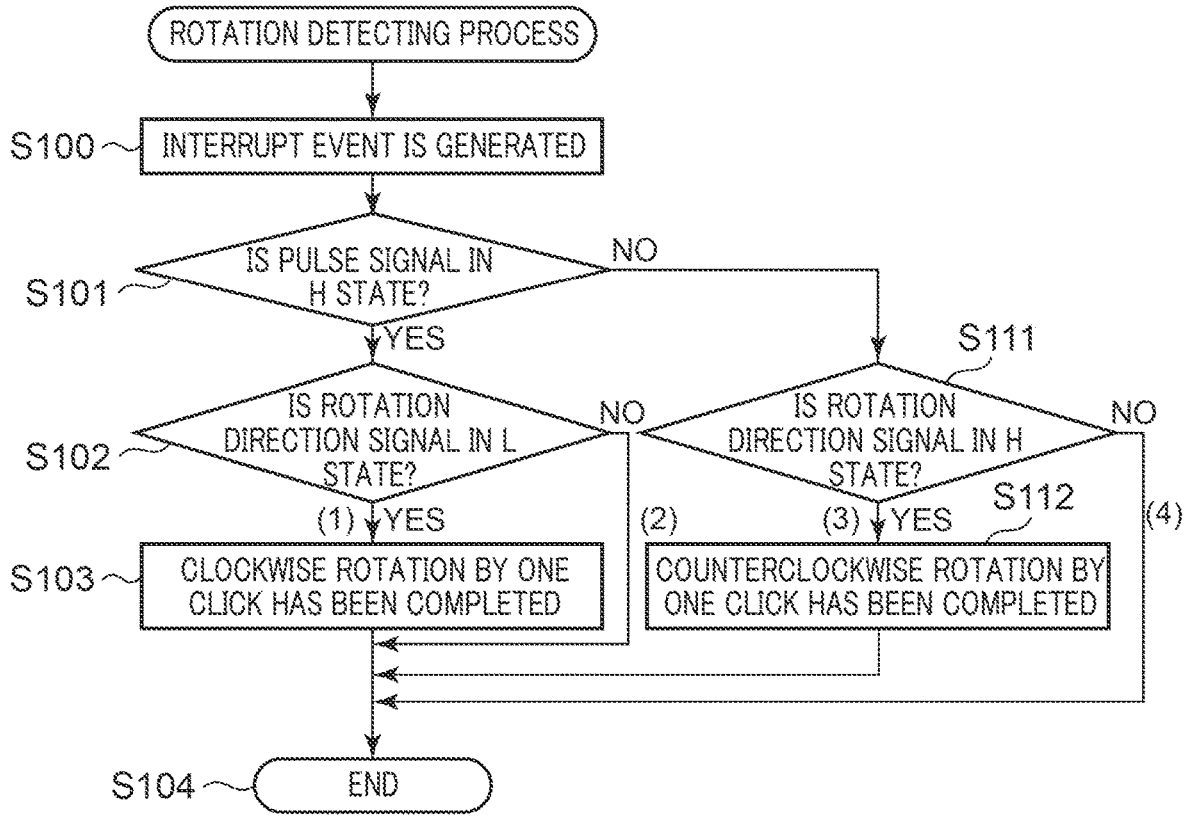
FIG. 8B is a flowchart showing a rotation detecting process in a case where an interrupt event is generated.

FIG. 8B is a flowchart showing a rotation detecting process by the CPU 150 based on the pulse signal 305 and the rotation direction signal 306.

The signal processing of the present embodiment selects any one of the rising edges and the falling edges of the pulse signal 305 depending on the output of the rotation direction signal 306.

Specifically, when the rotation direction signal 306 is in the L state (clockwise rotation), the rotation detecting process of the rotational operation member 200 is performed at the rising edges (305a1, 305a2, and 305a3) shown in the drawing.

When the rotation direction signal 306 is in the H state (counterclockwise rotation), the rotation detecting process is performed at the falling edges (305b1, 305b2, 305b3, and 305b4).

The rotation detecting process will now be described along the rotation angles in FIG. 8A.

During one clockwise click from the rotation angle I to the rotation angle II, the rotation direction signal 306 stays in the L state indicating the clockwise rotation.

Therefore, no processing is performed at the falling edge 305b1 of the pulse signal 305. When the rotational operation member 200 continues to be rotated from this state, the ball member 211 goes over a projection 230h of the jagged edge 230f at the rotation angle Ic.

When the state progresses to the rising edge 305a1 of the pulse signal 305 due to the continuous rotation of the rotational operation member 200, the CPU 150 determines that the rotational operation member 200 has been rotated by one click and performs a predetermined operation such as changing the settings of the image pickup apparatus 100.

When the state progresses to the rotation angle II, at which the ball member 211 comes into contact with a depression 230g, due to the continuous rotation of the rotational operation member 200; the operation for one click is completed. The same process is repeated for the next one click from the rotation angle II to the rotation angle III.

The case in which the rotational operation member 200 starts to be rotated counterclockwise at the rotation angle III will now be described. As described above, the user rotates the dial click by click.

Therefore, it is expected that the rotational operation member 200 is often rotated in the reverse direction at a given click position such as the rotation angle III.

In this case, the longitudinal magnetic flux density 301 and the transverse magnetic flux density 302 have symmetrical waveforms with respect to the rotation angle III.

During one click from the rotation angle III to the rotation angle II, the pulse signal 305 has no rising edge and no falling edge until the rotation angle IIIc, at which the ball member 211 goes over a projection 230h of the jagged edge 230f.

This is because the transverse magnetic flux density 302 does not fall below the lower threshold 307b to prevent the state of the transverse magnetic field signal 304 from being changed.

After the rotation angle IIIc, the longitudinal magnetic flux density 301 falls below the lower threshold 307b and the state of the longitudinal magnetic field signal 303 is changed from L to H at the time of the sampling at the rotation angle IIIb. This generates the falling edge 305b3 of the pulse signal 305.

At the same time, the combination of the states of the longitudinal magnetic field signal 303 and the transverse magnetic field signal 304 is changed to cause the state of the rotation direction signal 306 to be changed from L to H.

When the rotation direction signal 306 is in the H state, the rotation detecting process is performed at the falling edges of the pulse signal 305. The CPU 150 thus recognizes the above falling edge 305b3 to perform the rotation detecting process at the falling edge 305b3.

When the ball member 211 comes into contact with a depression 230g at the rotation angle II, the first counterclockwise click is completed.

The same process is repeated for the next counterclockwise click from the rotation angle II to the rotation angle I.

If only the rising edges of the pulse signal 305 are used during the time from the rotation angle III to the rotation angle II as in the case of the clockwise rotation, no rising edge is recognized between the rotation angle III and the rotation angle II.

Accordingly, the CPU 150 thus cannot detect the rotation. This means that the CPU 150 fails to detect the first counterclockwise click. As a result, the rotation intended by the user is not detected.

As shown, the rising edge 305a3 during the counterclockwise rotation exists between the rotation angle II and the rotation angle IIc.

The rotational operation member 200 being rotated by the user will now be described.

While the user is operating the rotational operation member 200, the rotational operation member 200 is rotated against the urging force of the spring member 212 (from the rotation angle II to the rotation angle IIc, for example), and then the ball member 211 goes over a projection 230h to cause the dial to be urged by the spring in the rotation direction (from the rotation angle IIc to the rotation angle III, for example). This process is repeated during the rotation.

Therefore, an edge of the signal indicating the rotation during one click should preferably exist between the rotation angle IIc and the rotation angle III, where the ball member 211 has gone over the projection 230h as a result of the user's intentional rotation of the rotational operation member 200.

This is because, if the rotation is detected between the rotation angle II and the rotation angle IIc as described above, the rotation may be detected at unexpected timing for the user due to the shake of the rotational operation member 200 or the like.

Moreover, if the rotation is detected only at any one of the rising edges and the falling edges, the clockwise or counterclockwise rotation is unfavorably detected at an edge of the pulse signal 305 before the ball member 211 going over a projection 230h.

Therefore, the rotation is not detected after the ball member 211 going over the projection 230h.

To solve these problems, the edges of the pulse signal 305 to be used are switched depending on the value of the rotation direction signal 306 as described above, which prevents a malfunction at the first click in the reverse operation.

This also enables the detection of the rotation every time the ball member 211 has gone over a projection 230*h* irrespective of the rotation direction, which provides the rotational operation member that has very few malfunctions and properly responds to the user's intention.

In addition, even if the reverse operation is performed during the ball member 211 going over a projection 230*h*, the above control enables the rotation operation reflecting the user's intention while preventing a malfunction.

FIG. 8B is a flowchart of the rotation detecting process described above. The actual operation of the CPU 150 will now be described with reference to the flowchart.

When a rising edge or a falling edge of the pulse signal 305 is generated, an interrupt event is generated in the CPU 150 to execute the rotation detecting process (step S100).

The CPU 150 determines whether the pulse signal 305 is in the H state at step S101. If the pulse signal 305 is in the H state, the process goes to step S102 and the CPU 150 determines whether the rotation direction signal 306 is in the L state.

If the rotation direction signal 306 is in the L state, the process goes to step S103 and the CPU 150 determines that the rotational operation member 200 has been rotated clockwise by one click.

The process then goes to step S104, where the rotation detecting process is completed. If the rotation direction signal 306 is not in the L state (the rotation direction signal 306 is in the H state) at step S102, the process goes to step S104 without performing any processing.

When the pulse signal 305 is not in the H state (the pulse signal 305 is in the L state) at step S101, the process goes to step S111 and the CPU 150 determines whether the rotation direction signal 306 is in the H state.

If the rotation direction signal 306 is in the H state, the process goes to step S112 and the CPU 150 determines that the rotational operation member 200 has been rotated counterclockwise by one click. The process then goes to step S104, where the rotation detecting process is completed.

If the rotation direction signal 306 is not in the H state (the rotation direction signal 306 is in the L state) at step S11, the process goes to step S104 without performing any processing, where the rotation detecting process is completed.

This flowchart corresponds to the waveforms of the signals in FIG. 8A as below.

When an interrupt event is generated at the falling edge 305*b*1, NO is selected at step S101 and NO is selected at step S111. The process thus takes the route (4) in FIG. 8B and no processing is performed.

When an interrupt event is generated at the rising edge 305*a*1, YES is selected at step S101 and YES is selected at step S102. The process thus takes the route (1) and the CPU 150 determines that the rotational operation member 200 has been rotated clockwise by substantially one click.

Likewise, when an interrupt event is generated at the falling edge 305*b*3, NO is selected at step S101 and YES is selected at step S111. The process thus takes the route (3) and the CPU 150 determines that the rotational operation member 200 has been rotated counterclockwise by substantially one click.

When an interrupt event is generated at the rising edge 305*a*3, YES is selected at step S101 and NO is selected at step S102. The process thus takes the route (2) and no processing is performed.

As described above, the process in accordance with the flowchart in FIG. 8B prevents a malfunction irrespective of the rotation direction of the rotational operation member 200 to perform the rotation detecting process that reflects the user's intention.

The positional relation between the magnet 251 and the magnet holding member 230 will now be described with reference to FIGS. 9A to 9C.

FIGS. 9A to 9C are schematic top views showing positional relations between the Hall IC 241 and the magnet 251.

FIG. 9A shows a state in which the Hall IC 241 faces an S pole of the magnet 251 and the ball member 211 is in a depression 230*g* of the jagged edge 230*f*.

FIG. 9B shows a state in which the Hall IC 241 faces an N pole of the magnet 251 and the ball member 211 is in a depression 230*g* of the jagged edge 230*f*.

FIG. 9C shows a state in which the Hall IC 241 faces the border between an S pole and an N pole of the magnet 251 and the ball member 211 is at the tip of a projection 230*h*.

The angles I, II, III, and IV in FIGS. 9A to 9C correspond to the respective rotation angles in FIGS. 6 to 8.

When the rotational operation member 200 is rotated clockwise by one click, the state changes from FIG. 9A to FIG. 9B.

When the rotational operation member 200 is rotated counterclockwise by one click, the state changes from FIG. 9B to FIG. 9A.

It should be noted that the state in FIG. 9A corresponds to the state in FIG. 5C, and the state in FIG. 9B corresponds to the state in FIG. 5E.

Moreover, the state in FIG. 9C corresponds to the state in FIG. 5D. In the sates shown in FIGS. 9A and 9B, the rotational operation member 200 is not being operated. In the state shown in FIG. 9C, the rotational operation member 200 is being rotated.

The control described above realizes the determination of the rotation direction and rotation amount of the dial also in a case where the number of the magnetic poles of the magnet 251 is equal to the number of the clicks of the rotational operation member 200.

This contributes to the downsizing of the magnet by preventing the increase in the number of the magnetic poles, which in turn downsizes the entire size of the rotational operation member.

Even if the downsizing of the magnet is not required, this realizes the narrowing of the rotation detection pitch to thereby contribute to high-precision rotation detection.

In the present embodiment, the magnet 251 is an annular magnet having twenty magnetic poles at regular pitches. Alternatively, the magnet 251 may consist of ten magnets, each of which having two magnetic poles (an S pole and an N pole) at both ends thereof, arranged in circle such that the opposite magnetic poles are adjacent to each other, which also provides similar advantageous effects.

In the present embodiment, the magnet 251 rotates integrally together with the rotational operation member 200. Alternatively, the magnet 251 and the rotational operation member 200 may be disposed at different places, but the magnet 251 may rotate in conjunction with the rotational operation member 200, which also provides similar advantageous effects.

The rotational operation member 200 disposed on the rear cover 110 of the image pickup apparatus 100 is described herein. The present invention, however, is not limited to this rotational operation member 200 and can be applied to other rotational operation members such as the dial 71 shown in FIG. 1.

A second embodiment of the present invention will now be described with reference to FIGS. 10 and 11.

The same elements as those in the first embodiment will be provided with the same reference signs, and the detailed description of these elements will be omitted.

In the present embodiment, the positional relation between the magnet 251 and the Hall IC 241 is different from the positional relation described in the first embodiment, and hence only the difference will now be described.

Figure 10:
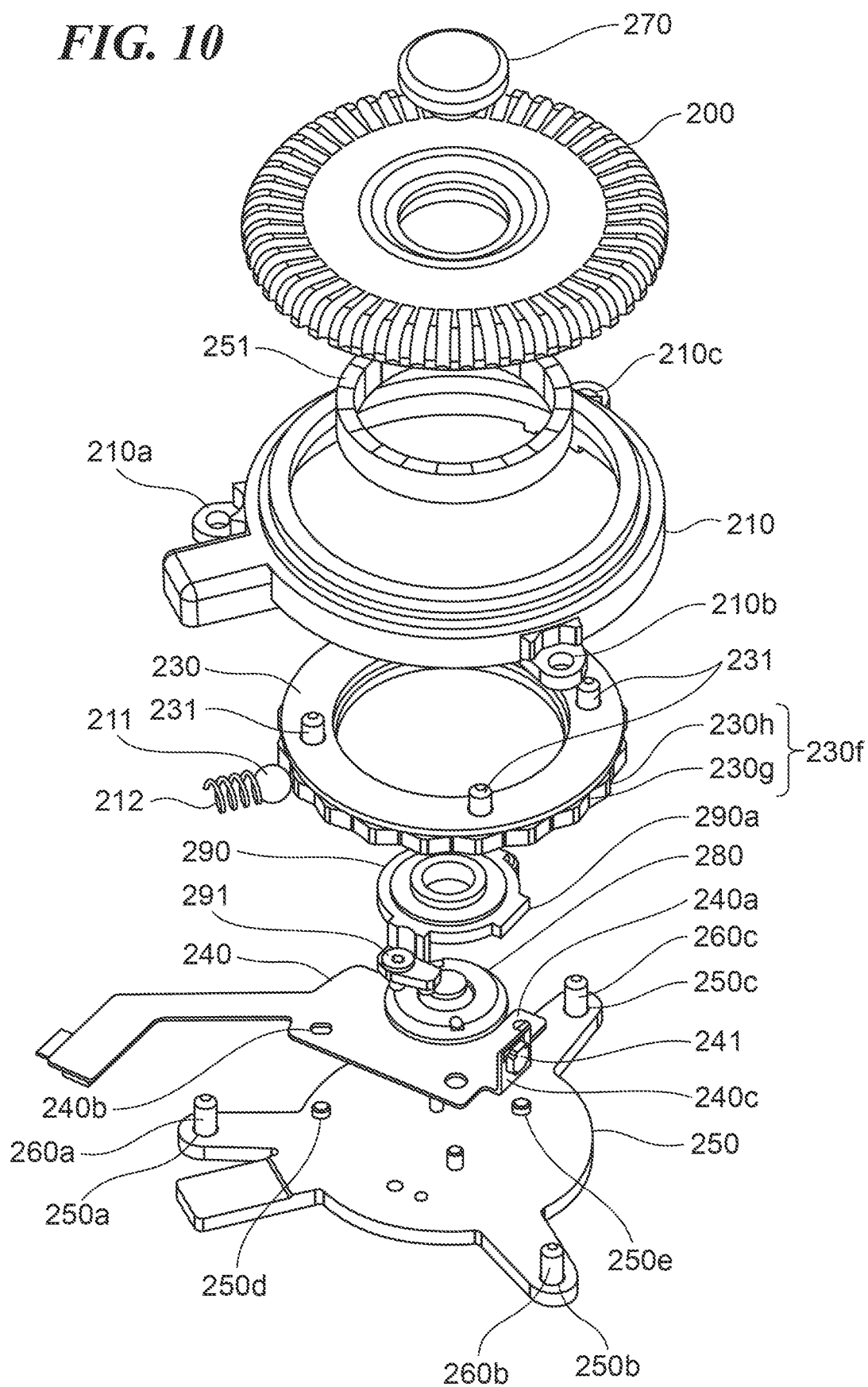
FIG. 10 is an exploded view showing a structure of a rotational operation member according to a second embodiment of the present invention.
Figure 11:
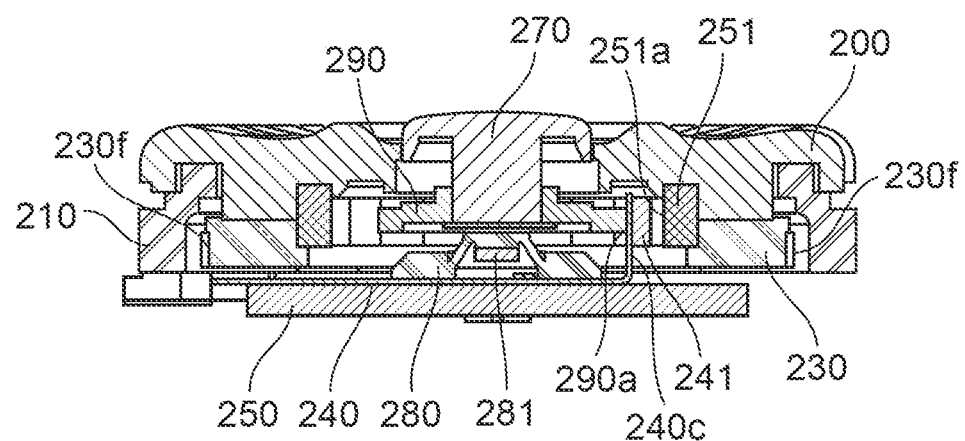
FIG. 11 is a cross-sectional view of the rotational operation member according to the present embodiment.

FIG. 10 is an exploded perspective view showing an example of the structure of the rotational operation member 200 with the Hall IC 241 disposed in the inside space of the magnet 251. FIG. 11 is a cross-sectional view of the rotational operation member 200 taken along the line passing through the center of the Hall IC 241.

A part of the base plate 240 is bent upward to provide a base plate upward bent part 240c. The Hall IC 241 is mounted on the base plate upward bent part 240c.

A base plate holding member 290 is fixed on the base plate fixing plate 250 by a screw 291 to cover the rubber switch 280 and the base plate 240.

The base plate holding member 290 includes a base plate holding part 290a, and the base plate upward bent part 240c is mounted on the base plate holding part 290a.

The magnet 251 is fixed between the rotational operation member 200 and the magnet holding member 230, and the polarized surfaces 251a are disposed on the inner surface of the magnet 251.

The Hall IC 241 is disposed to face the inner polarized surfaces 251a of the magnet 251.

The magnetic fields generated by the magnet 251 and the detection of the magnetic fields by the Hall IC 241 disposed in the inside space of the magnet 251 will now be described with reference to FIGS. 12A to 12E.

The same elements as those in the first embodiment will be provided with the same reference signs, and hence the detailed description of these elements will be omitted.

In the second embodiment, the Hall IC 241 as a single electric device includes a first magnetic field detecting part and a second magnetic field detecting part.

Figure 12A:
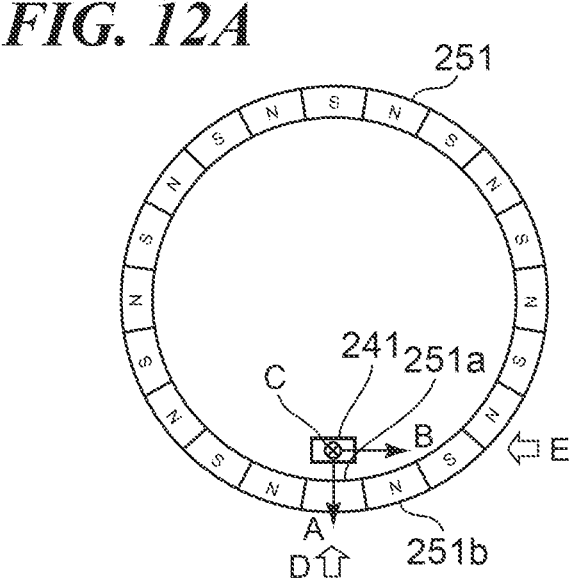
FIGS. 12A to 12E are views showing an arrangement of a magnet and a Hall IC according to the present embodiment.

FIG. 12A shows the magnet 251 and the Hall IC 241 viewed from the rotation axis direction of the dial. The magnet 251 and the Hall IC 241 are disposed such that the width-direction center of the magnet 251 is aligned with the detecting part 241a of the Hall IC 241 in the rotation axis direction (inside of the magnet 251).

The Hall IC 241 determines the magnetic flux density of a magnetic field in the direction orthogonal to the rotation axis of the magnet 251 (the direction orthogonal to the rotation axis of the dial or the direction of the arrow A), and the magnetic flux density of a magnetic field in the tangent direction to the circumference of the magnet 251 (the direction of the arrow B), and outputs predetermined signals indicating the conditions of the respective magnetic fields.

Figure 12B:
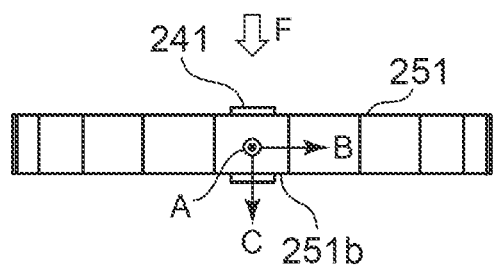

FIG. 12B shows the magnet 251 and the Hall IC 241 viewed from the direction orthogonal to the rotation axis (the direction opposite to the direction of the arrow A in the drawing).

The magnet 251 has the polarized surfaces 251a on the inner surface, and the Hall IC 241 faces the polarized surfaces 251a such that the center of the magnet 251 in the thickness direction is aligned with the detecting part 241a of the Hall IC 241.

Figure 12C:
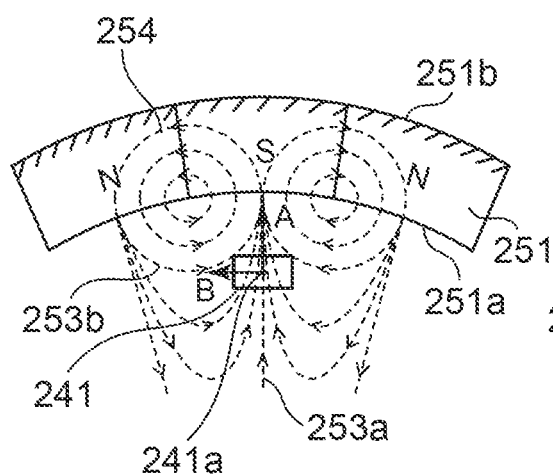
Figure 12D:
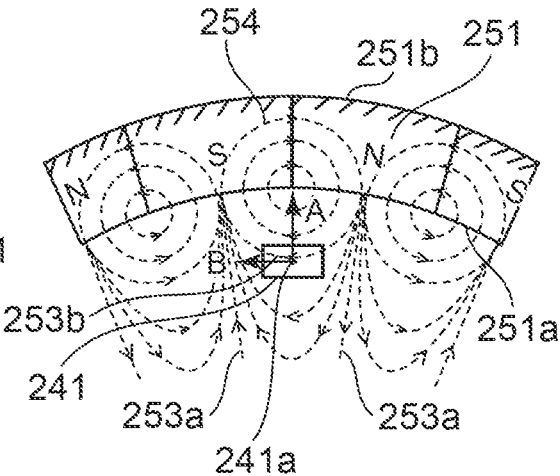

FIGS. 12C and 12D are enlarged views of three magnetic poles NSN of the magnet 251 viewed from the rotation axis direction of the dial (the direction of the arrow C).

FIG. 12C shows a state in which the detecting part 241a of the Hall IC 241 is aligned with the center of the S pole in the lateral direction of the drawing.

FIG. 12D shows a state in which the detecting part 241a of the Hall IC 241 is aligned with the border between the S pole and the N pole after the rotation of the magnet 251 around the rotation axis of the dial from the state shown in FIG. 12C.

Figure 12E:
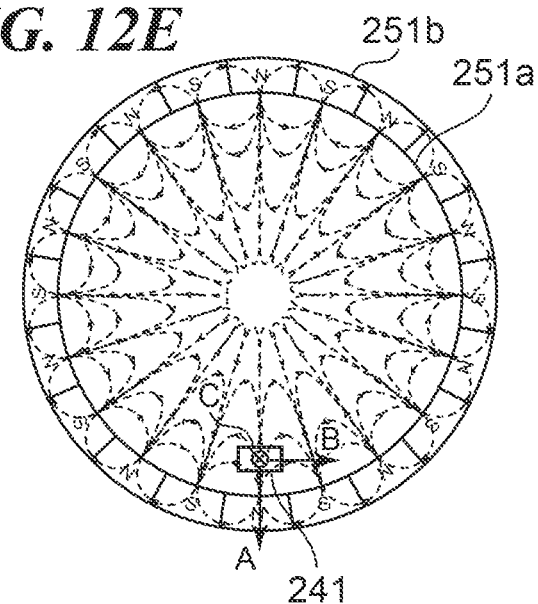

FIG. 12E is a view of the magnet 251 viewed from the rotation axis direction of the dial (the direction of the arrow C).

FIG. 12E shows a state in which the detecting part 241a of the Hall IC 241 is aligned with the center of the N pole. A combination of both FIG. 12D and FIG. 12E analogizes a state in which the detecting part 241a of the Hall IC 241 is aligned with the border between one of the S poles and the N pole after the rotation of the magnet 251 around the rotation axis of the dial from the state shown in FIG. 12E, a drawing of which is, therefore, omitted.

As in the magnetic fields shown in FIG. 5, the magnetic fields shown in FIGS. 12C to 12E go up orthogonally from the polarized surfaces 251a of the N poles, curve toward the S poles, and go down orthogonally to the polarized surfaces 251a of the S poles.

As shown in FIG. 12E, the magnetic fields generated from the polarized surfaces 251a of the magnet 251 are formed only in the inside space of the magnet 251.

As described above, in the magnetic fields of the magnet 251, most of the elements are parallel to the plane defined by the arrows A and B and very few elements are in the direction of the arrow C.

Therefore, disposing the polarized surfaces 251a only on the inner surface of the magnet 251 reduces the leakage of the magnetic fields out of the magnet 251.

This structure reduces the effects of the magnetic fields on an image sensor and electric elements in the image pickup apparatus, and also on external apparatuses used together with the image pickup apparatus.

The arrows D, E, and F in FIGS. 12A and 12B show the directions of the external magnetic fields from the outside of the rotational operation member 200 to the detecting part 241a of the Hall IC 241.

The structure for reducing the effects of the external magnetic fields on the detection performance of the Hall IC 241 will now be described.

As show in FIG. 1B, the rotational operation member 200 is disposed on the rear cover 110 of the image pickup apparatus 100, and the Hall IC 241 is disposed near the rear cover 110.

The Hall IC 241 is thus affected by the external magnetic fields more or less. To solve this problem, the rear cover 110 of the second embodiment is made of a magnetic metal member.

As for the elements in the directions of the arrows D and E of the external magnetic fields having effects on the magnetic fields detected by the Hall IC 241, the Hall IC 241 is disposed in the inside space of the rotational operation member 200.

These elements are thus shielded by the rear cover 110 as a magnetic metal member to a certain degree.

In the second embodiment, the magnetic field detection axis of the Hall IC 241 is in the direction orthogonal to the rotation axis (the direction of the arrow A) and in the tangent direction to the circumference of the magnet 251 (the direction of the arrow B), and not in the rotation axis direction of the dial (the direction of the arrow C).

This structure eliminates the effects of the external magnetic field elements in the direction of the arrow F on the magnetic fields detected by the Hall IC 241, which reduces the effects of the external magnetic fields.

In the second embodiment described above, the structure in which the annular magnet 251 has the polarized surfaces on the inner surface and the Hall IC 241 is disposed in the inside space of the magnet 251 reduces the leakage of the magnetic fields from the magnet 251 to the outside.

In the second embodiment, the Hall IC 241 is disposed such that the detection axis is disposed along the direction orthogonal to the rotation axis (the direction of the arrow A) and the tangent direction to the circumference of the magnet 251 (the direction of the arrow B).

This structure eliminates the effects of the external magnetic fields (in the direction of the arrow E) on the magnetic fields detected by the Hall IC 241. Also in this structure, the process in accordance with the flowchart in FIG. 8B provides advantageous effects similar to the advantageous effects of the first embodiment.

A third embodiment will now be described with reference to FIGS. 13A and 13B.

The same elements as those in the first embodiment will be provided with the same reference signs, and the detailed description of these elements will be omitted.

In the present embodiment, the positional relation between the magnet 251 and the Hall IC 241 is different from the positional relation described in the first embodiment, and hence only the difference will now be described.

In the present embodiment, the magnet 251 has twelve magnetic poles.

In the drawing, the N poles are shown in white and the S poles are shown in shading. A Hall IC 241*b* detects a magnetic field in one direction, and a Hall IC 241*c* detects a magnetic field in another direction.

The Hall IC 241*b* determines a magnetic flux density in the same longitudinal magnetic field direction as in the first embodiment and outputs a longitudinal magnetic field signal shown in the first embodiment, and the Hall IC 241*c* determines a magnetic flux density in the same transverse magnetic field direction as in the first embodiment and outputs a transverse magnetic field signal shown in the first embodiment.

Figure 13A:
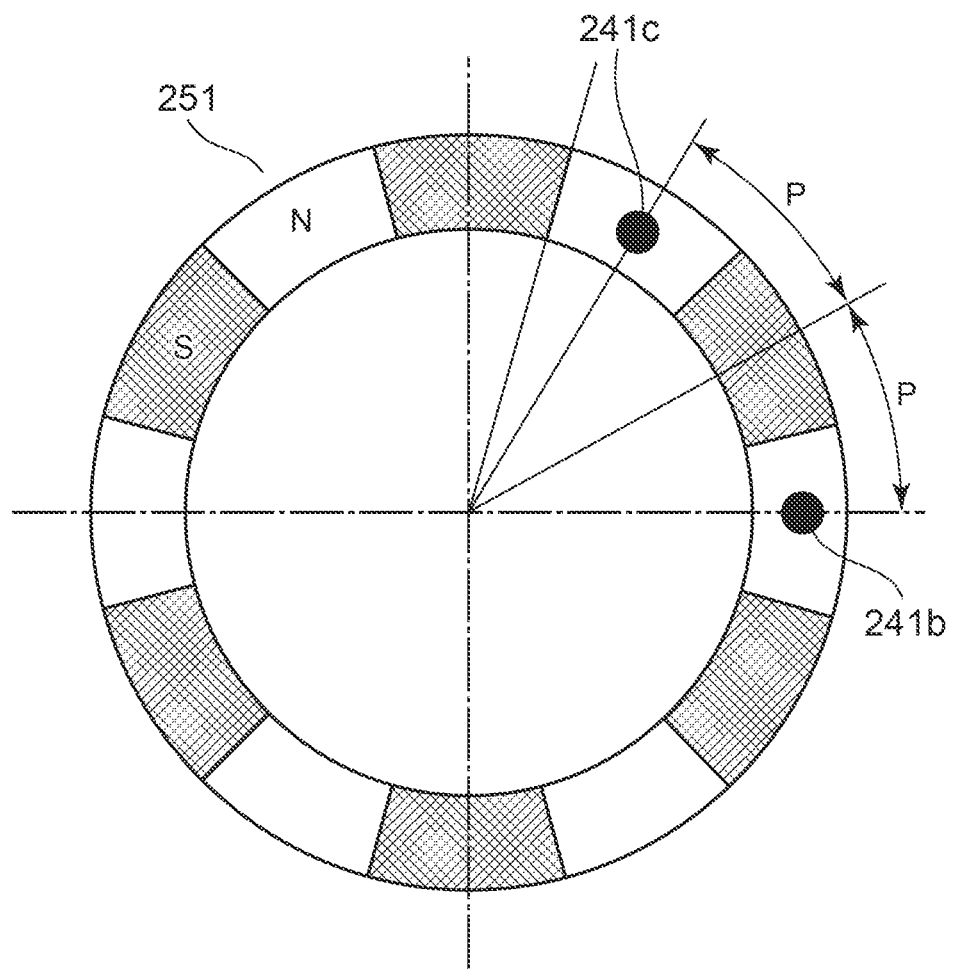
FIGS. 13A and 13B are views each showing an arrangement of a magnet and Hall ICs according to a third embodiment of the present invention.

As shown in FIG. 13A, the magnetic pole pitch of the magnet 251 is denoted by P. The Hall IC 241*b* is disposed 2 pitches away from the Hall IC 241*c*.

A magnetic flux density determined by the Hall IC 241*b* shows a waveform shifted from the waveform of a magnetic flux density determined by the Hall IC 241*c* by a half magnetic pole pitch, as shown in the longitudinal magnetic flux density 301 and the transverse magnetic flux density 302 in FIG. 6A.

Accordingly, the longitudinal magnetic field signal and the transverse magnetic field signal based on these magnetic flux densities are shifted from each other by a half magnetic pole pitch. The CPU 150 can thus generate a signal equivalent to the pulse signal 305 of the first embodiment by calculating the exclusive or of the longitudinal magnetic field signal and the transverse magnetic field signal.

The rotation direction signal 306 can also be generated based on changes in the states of the longitudinal magnetic field signal and the transverse magnetic field signal. The rotation of the rotational operation member 200 can thus be detected properly by taking a process equivalent to the process shown in the flowchart in FIG. 8B.

It should be noted that the arrangement of the two Hall ICs is not limited to the arrangement with approximately 2 pitches. Alternatively, one Hall IC may be disposed substantially an even multiple of the magnetic pole pitch away from the other Hall IC. This arrangement provides similar advantageous effects.

It should be noted that a change in the positional relation between the Hall ICs causes a change in the shift between the longitudinal magnetic field signal 303 and the transverse magnetic field signal 304. Accordingly, the Hall ICs should be disposed with respect to each other within a range in which the shift between the signals is permissible.

Two detecting parts disposed in the present embodiment can eliminate the single device that detects magnetic fields in two directions as in the first and second embodiments.

This means that the rotation of the rotational operation member 200 can be detected by using inexpensive Hall ICs, each of which detects a magnetic field in one direction, instead of a single Hall device that detects magnetic fields in two directions, which reduces the manufacturing costs.

The present invention is not limited to the magnet 251 and two Hall ICs. Alternatively, a photo-reflector may be used.

Figure 13B:
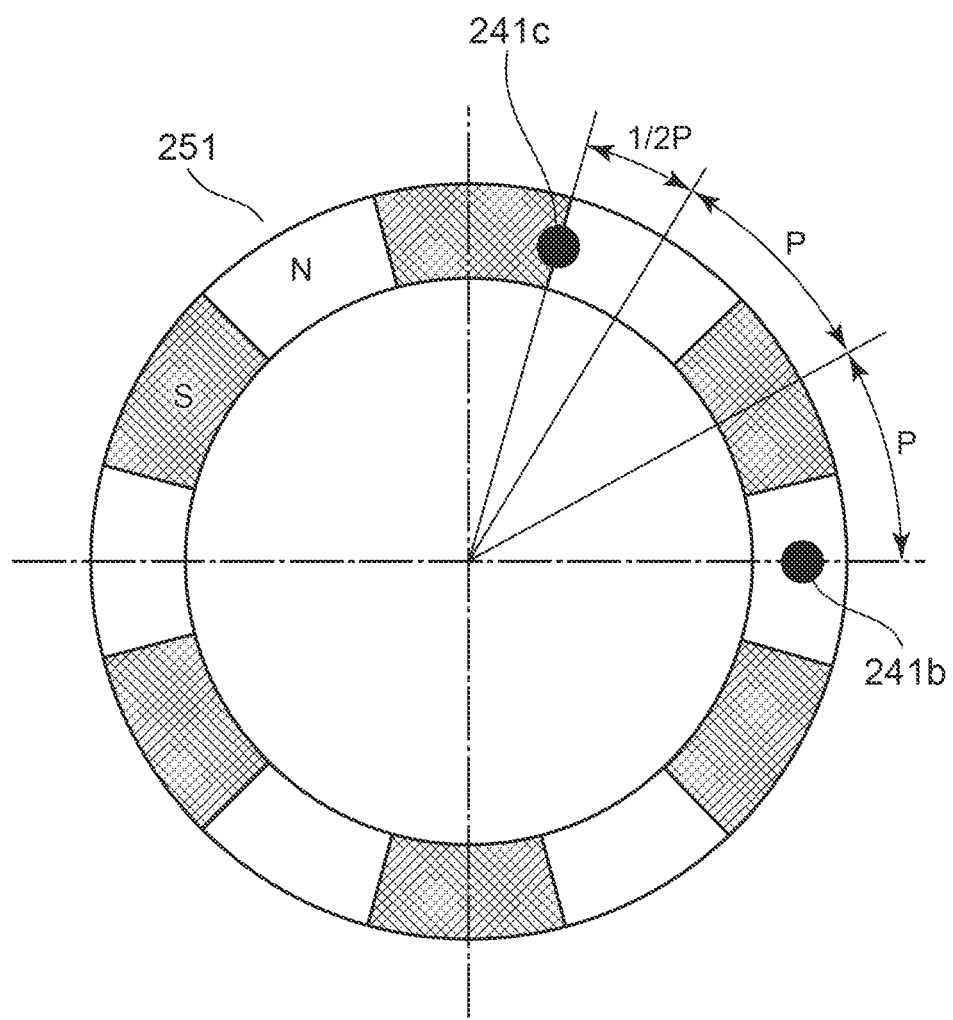

For example, the Hall IC 241*b* and the Hall IC 241*c* shown in FIG. 13B may be replaced by photo-reflectors which are away from each other by 2.5 pitches different from an even multiple of the magnetic pole pitch, and the magnet 251 may be replaced by a reflecting plate having a combination of high-reflectance parts and non-reflective parts.

In this case, the white parts of the magnet 251 are replaced by the high-reflectance parts and the shaded parts of the magnet 251 are replaced by the non-reflective parts, so that signals equivalent to the longitudinal magnetic field signal 303 and the transverse magnetic field signal 304 shown in FIG. 6A are generated by the two photo-reflectors (these equivalent signals each have a period corresponding to the double of the magnetic pole pitch).

In this case, the signal generating unit includes the reflecting plate that switches the light reflectance in a period corresponding to the double of a predetermined rotation angle, and a plurality of photoelectric conversion elements that is arranged with a pitch different from the pitch corresponding to an even multiple of the predetermined rotation angle.

The rotation of the rotational operation member 200 can thus be detected by performing the process described above.

In FIG. 13B, the Hall ICs 241*b* and 241*c* may be replaced by brush armatures and the magnet 251 may have a continuity pattern in which the state of a signal is changed from H to L in a period corresponding to the double of the magnetic pole pitch, which provides similar advantageous effects.

In this case, the signal generating unit includes the circuit board that switches the resistance in a period corresponding to the double of a predetermined rotation angle, and the electric armatures that are arranged with a pitch different from the pitch corresponding to an even multiple of the predetermined rotation angle and determines the resistance of the circuit board.

Figure 14:
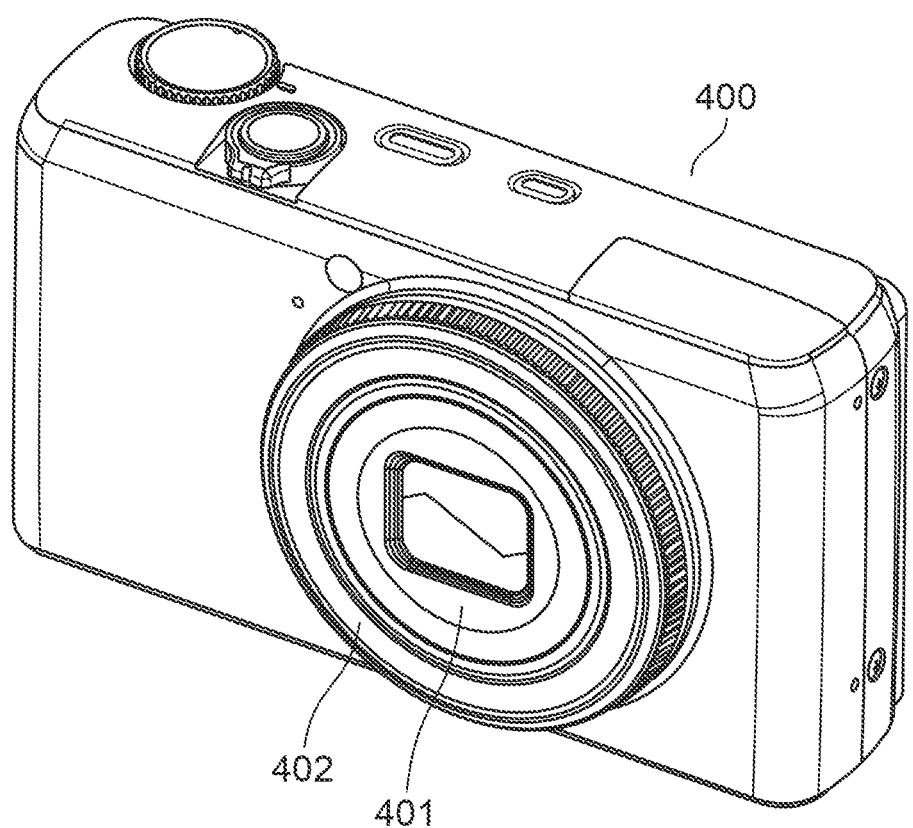
FIG. 14 is an external view of an electronic equipment according to a fourth embodiment of the present invention.

The rotational operation member 200 of the present invention may be a rotary ring 402 disposed around a lens-barrel 401 of a camera 400 shown in FIG. 14, for example.

The user can optionally allocate functions to the rotary ring 402 of the camera 400 to perform the optional functions by adjusting the rotation amount and rotation direction of the rotary ring 402. The optional functions here are auxiliary functions for shooting.

As in the above structure of the rotational operation member 200, the magnet 251 (not shown) is disposed in the inside space of the rotary ring 402.

The magnet 251 rotates together with or in conjunction with the rotary ring 402. The rotary ring 402 has a click mechanism and is rotated click by click.

The Hall IC 241 (not shown) is disposed on the camera 400 to face the magnet 251.

As in the above structure of the rotational operation member 200, the number of the magnetic poles of the magnet 251 is equal to the number of the clicks of the rotary ring 402 also in this case. The rotation of the ring-shaped rotary ring 402 can be detected by performing the process described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-171176, filed Sep. 6, 2017, which is hereby incorporated by reference herein in its entirety.

What is claimed is:

1. An electronic equipment comprising:
a rotational operation member rotatably held with respect to a rotation axis;
a click mechanism configured to provide a click feeling at each predetermined rotation angle by rotation of the rotational operation member;
a magnetic field generating member having magnetic poles with different magnetic properties arranged at regular intervals;
a first magnetic field detecting part having a first detection axis and configured to detect a variation of a first direction-related magnetic field generated by the magnetic field generating member;
a second magnetic field detecting part having a second detection axis and configured to detect a variation of a second direction-related magnetic field generated by the magnetic field generating member, the second direction being different from the first direction; and
a calculating unit configured to calculate a rotation amount and a rotation direction of the rotational operation member based on the variation of the first direction-related magnetic field and the variation of the second direction-related magnetic field that are caused by a change in a positional relation of the first and second magnetic field detecting parts with the magnetic field generating member due to the rotation of the rotational operation member,
wherein the first detection axis and the second detection axis are arranged respectively at different angles to a polarized surface of the magnetic field generating member, and
wherein the first magnetic field detecting part changes a first magnetic field signal depending on whether the first direction-related magnetic field exceeds a predetermined threshold,
the second magnetic field detecting part changes a second magnetic field signal depending on whether the second direction-related magnetic field exceeds the predetermined threshold, and
the calculating unit calculates the rotation amount and the rotation direction of the rotational operation member based on the first and second magnetic field signals.

2. The electronic equipment according to claim 1, wherein the magnetic field generating member generates a magnetic field in a plane orthogonal to the rotation axis of the rotational operation member and between the magnetic field generating member and the rotation axis, and
the first and second magnetic field detecting parts are disposed between the magnetic field generating member and the rotation axis.

3. The electronic equipment according to claim 2, wherein the magnetic field generating member generates a magnetic field only from a surface facing the first and second magnetic field detecting parts.

4. The electronic equipment according to claim 1, wherein the first and second magnetic field detecting parts are disposed in a single electric element.

5. The electronic equipment according to claim 1, wherein the magnetic field generating member is an annular magnet having N poles and S poles arranged alternately at regular intervals.

6. The electronic equipment according to claim 1, wherein the magnetic field generating member includes a plurality of magnets arranged in circle at regular intervals.

7. The electronic equipment according to claim 1, wherein the rotational operation member is a rotary ring disposed around a lens-barrel, and the magnetic field generating member is a ring-shaped member disposed around the lens-barrel.

8. The electronic equipment according to claim 1,
wherein the first and second magnetic field detecting parts are disposed along a rotation direction of the magnetic field generating member, and the first magnetic field detecting part is disposed away from the second magnetic field detecting part by an even multiple of a distance between adjacent magnetic poles of the magnetic field generating member.

9. The electronic equipment according to claim 8, wherein the distance between adjacent magnetic poles of the magnetic field generating member corresponds to the predetermined rotation angle.

10. The electronic equipment according to claim 1, wherein the first detection axis and the second detection axis are orthogonal to each other.

11. The electronic equipment according to claim 1, wherein the first detection axis and the second detection axis are arranged respectively in a direction orthogonal to the polarized surface of the magnetic field generating member and a direction parallel to the polarized surface of the magnetic field generating member.

12. The electronic equipment according to claim 4, wherein the calculating unit calculates the rotation amount and the rotation direction of the rotational operation member based on the variation of the first direction-related magnetic field and the variation of the second direction-related magnetic field that are caused by the change in the positional relation of the first and second magnetic field detecting parts with the magnetic field generating member, the change corresponding to one magnetic pole of the magnetic field generation member.

* * * * *